(12) United States Patent
Johnson et al.

(10) Patent No.: US 10,685,063 B2
(45) Date of Patent: Jun. 16, 2020

(54) TIME-BASED QUERYING OF GRAPH DATABASES

(71) Applicant: AT&T Intellectual Property I, L.P., Atlanta, GA (US)

(72) Inventors: Theodore Johnson, New York, NY (US); Vladislav Shkapenyuk, New York, NY (US); Pramod A. Jamkhedkar, Bridgewater, NJ (US); Yaron Kanza, Fair Lawn, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 780 days.

(21) Appl. No.: 15/268,288

(22) Filed: Sep. 16, 2016

(65) Prior Publication Data

US 2018/0081943 A1   Mar. 22, 2018

(51) Int. Cl.
G06F 16/00      (2019.01)
G06F 16/901     (2019.01)
G06F 16/2458    (2019.01)

(52) U.S. Cl.
CPC ...... *G06F 16/9024* (2019.01); *G06F 16/2477* (2019.01)

(58) Field of Classification Search
None
See application file for complete search history.

(56) References Cited

U.S. PATENT DOCUMENTS

| | | | |
|---|---|---|---|
| 5,802,508 A | 9/1998 | Morgenstern | |
| 5,870,564 A | 2/1999 | Jensen et al. | |
| 6,029,162 A | 2/2000 | Schultz | |
| 6,219,833 B1 | 4/2001 | Solomon et al. | |
| 6,778,970 B2 | 8/2004 | Au | |
| 7,210,121 B2 | 4/2007 | Xia et al. | |
| 7,408,881 B2 | 8/2008 | Acharya et al. | |
| 7,447,667 B2 | 11/2008 | Gong et al. | |
| 7,668,665 B2 | 2/2010 | Kim | |
| 7,743,066 B2 | 6/2010 | Meijer et al. | |
| 7,836,119 B2 | 11/2010 | Lucas et al. | |
| 8,429,630 B2 | 4/2013 | Nickolov et al. | |
| 8,543,554 B1 | 9/2013 | Singh et al. | |
| 8,688,827 B2 | 4/2014 | Gonzalez-Banos et al. | |

(Continued)

FOREIGN PATENT DOCUMENTS

| | | |
|---|---|---|
| CA | 2200924 C | 2/2001 |
| EP | 2549697 A1 | 1/2013 |
| WO | WO 2007/095331 A2 | 8/2007 |

OTHER PUBLICATIONS

Nepal et al.; "Query Issues in Image(multimedia) Databases"; Data Engineering, 1999 Proceedings 15th Int'l Conference; 8 pages.

(Continued)

*Primary Examiner* — Anhtai V Tran
(74) *Attorney, Agent, or Firm* — BakerHostetler

(57) ABSTRACT

A method includes receiving, via a processor, a query comprising pathway variables and at least one evaluation time and determining an anchor set based on at least one of the pathway variables. The method also includes translating the pathway variables into a pathway algebraic expression based on the anchor set and the at least one evaluation time, and executing the pathway algebraic expression on a graph database to return a pathway set.

20 Claims, 14 Drawing Sheets

(56) References Cited

U.S. PATENT DOCUMENTS

| | | |
|---|---|---|
| 8,689,171 B2 | 4/2014 | Lucas et al. |
| 8,826,255 B1 | 9/2014 | Avadhanula et al. |
| 9,075,818 B2 | 7/2015 | Cavage et al. |
| 9,170,812 B2 | 10/2015 | Vorbach et al. |
| 9,286,187 B2 | 3/2016 | Brucker et al. |
| 9,379,971 B2 | 6/2016 | Sem-Jacobsen et al. |
| 2004/0111255 A1 | 6/2004 | Huerta et al. |
| 2006/0041661 A1 | 2/2006 | Erikson et al. |
| 2006/0212429 A1 | 9/2006 | Bruno et al. |
| 2008/0120594 A1 | 5/2008 | Lucas et al. |
| 2009/0112932 A1 | 4/2009 | Skierkowski et al. |
| 2011/0314382 A1 | 12/2011 | Sweeney |
| 2013/0117272 A1 | 5/2013 | Barga et al. |
| 2013/0261965 A1 | 10/2013 | Delling et al. |
| 2014/0122452 A1 | 5/2014 | Faerber et al. |
| 2014/0172914 A1* | 6/2014 | Elnikety ............. G06F 16/9024 707/774 |
| 2014/0372438 A1 | 12/2014 | Chandramouli et al. |
| 2015/0026158 A1* | 1/2015 | Jin .................... G06F 16/90335 707/722 |
| 2015/0286684 A1 | 10/2015 | Heinz et al. |
| 2015/0347559 A1 | 12/2015 | Elias et al. |

OTHER PUBLICATIONS

Christophides et al.; "From Structured Documents to Novel Query Facilities"; ACM SIGMOD Record; vol. 23 No. 2; 1994; 19 pages.

Bakker et al.; "A Query Language Solution for Shortest Path Problems in Cyclic Geometries"; Proceedings of the IASTED Int'l Conference; Feb. 17-19, 2004; p. 203-207.

Yu et al.; Service selection algorithms for Web services with end-to-end Qos constraints; Dept. of Electrical Engineering and Computer Science; University of California; 2005; p. 103-126.

Lee et al.; "A Psuedo-Distance Routing (PDR) Algorithm for Mobile Ad-hoc Networks"; IEICE Trans. Fundamentals; vol. E89 No. 6; Jun. 2006; p. 1647-1656.

Boulmakoul; "Fuzzy graphs modelling for HazMat telegeomonitoring"; European Journal of Operational Research; vol. 175; 2006; p. 1514-1525.

\* cited by examiner

TIME-BASED QUERYING OF GRAPH DATABASES

TECHNICAL FIELD

This disclosure relates generally to network management and, more specifically, to systems and methods for modeling networks using a graph database that may be queried to discovery pathways in the network.

BACKGROUND

Communication networks have migrated from using specialized networking equipment executing on dedicated hardware, like routers, firewalls, and gateways, to software defined networks (SDNs) executing as virtualized network functions (VNF) in a cloud infrastructure. Network control is directly programmable and the underlying infrastructure is virtualized and abstracted from network services and functions. The ensemble of entities that may comprise a service—VNFs, VNF components (VFCs), virtual machines (VMs), and physical hardware—may dynamically change as the system continues to operate. The complex and dynamic nature of virtualized SDNs makes inventory management a challenging task. An inventory database may facilitate the creation of SDN applications using a modeling language to achieve model-driven networking.

Traditional graph query languages may not be designed to query a layered network inventory for discovering connectivity between nodes.

Further, the output of preexisting query languages are such that an additional query cannot be posed on the results of an original query. For example, some common query languages output a graph, while others may output a tuple of values, upon which an additional query cannot be applied. That is, preexisting query languages do not treat pathways as first-class citizens.

To facilitate network management, it may be advantageous to query a network inventory to discover specific nodes, connectivity between nodes in some layer, hosting relationships between nodes on different layers, or induced pathways. Current query languages may not allow clear expression of such queries because such queries do not treat pathways as first-class citizens of the language. That is, such query languages are not closed under composition.

Further, conventional graph databases store a single "current time" inventory. If a change is made to the nodes and edges (e.g., inserted, deleted, or changed), the relevant nodes and edges are inserted, deleted, or updated, respectively, and no record is kept of the previous state.

There is a need for a technology that facilitates temporal modeling of communication networks, including the types of network elements and the connections therebetween, in such a way that enables querying of that model to enable troubleshooting and creating of SDN applications, including queries for discovering pathways in the network, manipulating pathways, and time-travel queries.

This disclosure is directed to solving one or more of the problems in the existing technology.

SUMMARY

In an aspect, this disclosure may be directed to a system. The system may include a processor and an input. The system may also include memory comprising a graph database and executable instructions, wherein the executable instructions may cause the processor to effectuate operations. The operations may include receiving, via the input, a query. The query may include pathway variables and at least one evaluation time. The operations may include determining an anchor set based on at least one of the pathway variables. The operations may also include translating the pathway variables into a pathway algebraic expression based on the anchor set and the at least one evaluation time. The operations may include executing the pathway algebraic expression on the graph database to return a pathway set.

In another aspect, this disclosure may be directed to a method. The method may include receiving, via a processor, a query. The query may include pathway variables and at least one evaluation time. The method may include determining an anchor set based on at least one of the pathway variables. The method may also include translating the pathway variables into a pathway algebraic expression based on the anchor set and the at least one evaluation time. The method may include executing the pathway algebraic expression on a graph database to return a pathway set.

According to another aspect, this disclosure may be directed to a method. The method may include receiving, via a processor, a query comprising pathway variables and a time interval. The method may also include determining an anchor set based on at least one of the pathway variables and translating the pathway variables into a pathway algebraic expression based on the anchor set and the at least one evaluation time. The method may also include executing the pathway algebraic expression on a graph database to return a pathway set. The pathway set may include a pathway and a valid time associated with the pathway.

BRIEF DESCRIPTION OF THE DRAWINGS

Temporal modeling of communication networks, and queries thereof, may enable troubleshooting and creating of SDN applications, including queries for discovering pathways in the network, manipulating pathways, and time-travel queries. For example, querying past states of graph databases may be used to detect causes of degradation of service of quality. For example, if problems in service quality began at a first time, a network engineer may query a graph database to determine a status of the communication network at one or more times around the first time to determine the cause of such degradation.

Aspects of the herein described systems and methods for network modeling and building, updating, and querying a graph database are described more fully with reference to the accompanying drawings, which provide examples. In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

FIG. 1b is a layered model that represents a layered graph database based on the exemplary network of FIG. 1a.

FIG. 3 is a schematic of an exemplary device that may be a component of the system of FIG. 2a.

DETAILED DESCRIPTION

Figure 1A:
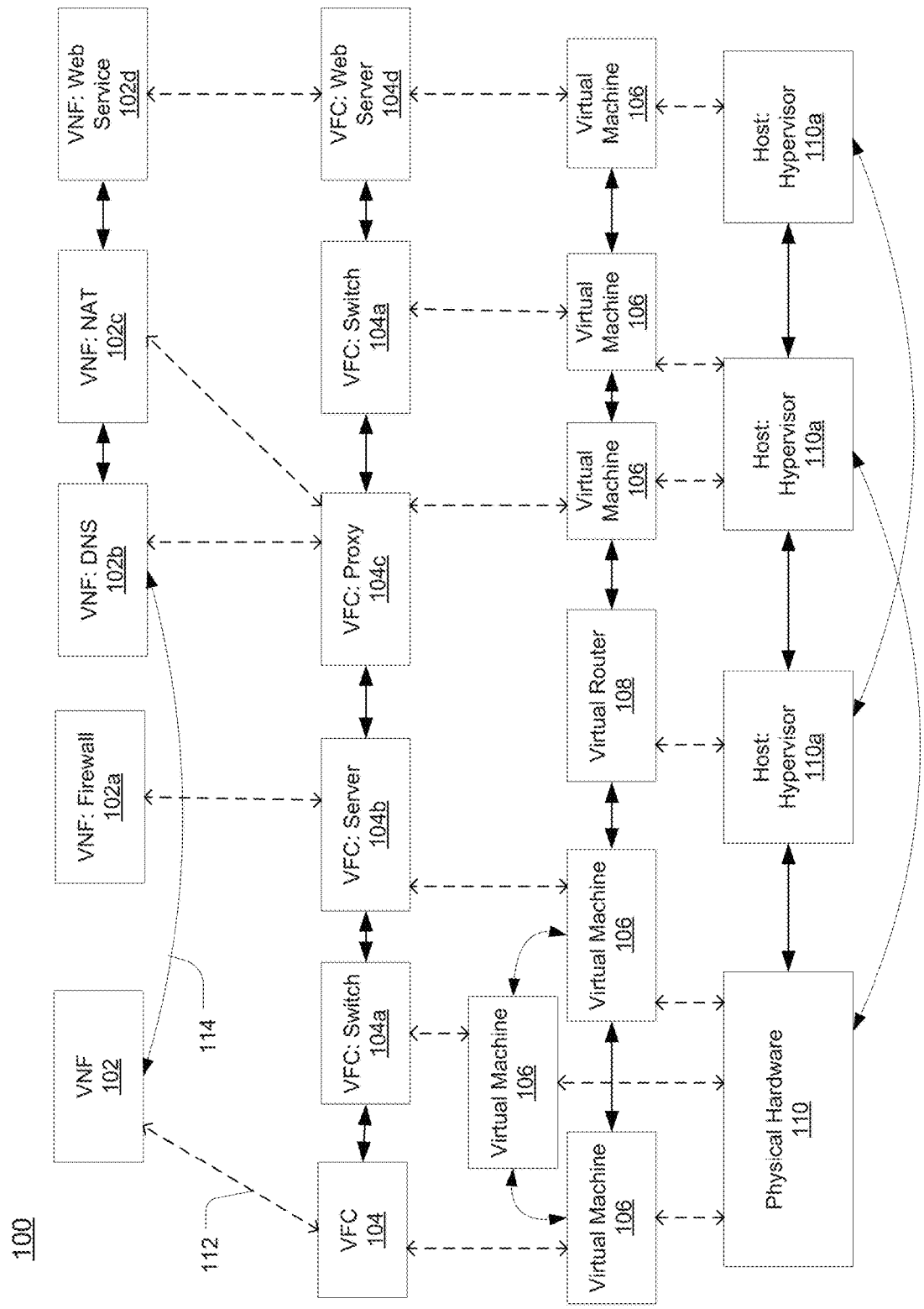
FIG. 1a is a representation of an exemplary network.

FIG. 1a is a representation of an exemplary communication network 100. Generally, communication networks 100 may be large, dynamic, or complicated. To deploy, maintain, and troubleshoot such networks 100, it may be advantageous to understand how network elements—such as servers, switches, virtual machines, and virtual network functions—are connected to one another. It may also be advantageous to discover communication paths between network elements, and how such relationships may change over time.

Network 100 may include network entities, including virtual network functions (VNFs) 102, such as a VNF: firewall 102a, a VNF: DNS 102b, a VNF: NAT 102c, or a VNF: web service 102d; VNF components (VFCs) 104, such as a VFC: switch 104a, a VFC: server 104b, a VFC: proxy 104c, or a VNF: web server 104d; a virtual machine (VM) 106; a virtual router 108; or physical hardware 110, such as a hypervisor host 110a. Relationships between nodes may include hosted-on, communicates-with, or the like. For example, in FIG. 1a, vertical edges (dashed arrows) 112 may represent hosting relationships and horizontal edges (solid arrows) 114 may represent connectivity links.

An inventory of an SDN, like network 100, may store both the network entities as well as their relationships. These relationships may include which VNFs 102 make up VFC 104, which VMs 106 are running which VFCs 104, communication paths between VFCs 104, communication paths between one or more VFCs 104 and VNFs 102, which entities are hosting which other network entities, and the like.

Figure 1B:

A network inventory or temporal network inventory of communication network 100 may be built. FIG. 1b illustrates an exemplary layered model 120 based on network 100. The network hierarchy model 120 may be built using a schema, and this network hierarchy model 120 may be a layered graph. Further, a query language may be used to query the network inventory, such as based on the schema. In an aspect, the schema and the query language may support Topology and Orchestration Specification for Cloud Applications (TOSCA) abstractions.

The schema may comprise two class types (node classes and edge classes) and two hierarchies (node-class hierarchy and edge-class hierarchy). A node-class hierarchy $H_V$ may be a hierarchy over node classes, and an edge-class hierarchy $H_E$ may be a hierarchy over edge classes. The hierarchies may represent inheritance, as in object-oriented models, and may be used to support a TOSCA model. The hierarchies may be used in integrity constraints, to guarantee that a structure of the data complies with the schema. In an aspect, the schema may facilitate querying networks 100, including large, complicated networks, and may help in cases where the user only has partial information regarding the types of nodes or edges in the network.

A network inventory 120 may represent the components of network 100 and the relationships between them. A network inventory may be defined with respect to a schema, and it may be modeled as a directed graph whose nodes and edges may be instances of the node and edge classes of the schema, respectively. For example, $(C_V, C_E, H_V, H_E)$ may be a schema with a set $C_V$ of node classes, a set $C_E$ of edge classes, a node hierarchy $H_V$, and an edge hierarchy $H_E$. A network inventory over the schema may be a directed graph $G=(V, E)$, where V is a set of nodes and E, a subset of directed edges, is a subset of V×V. In the direct graph, node v may be an element of V and may be an instance of some class $C_v$, which itself may be an element of $C_V$ with respect to $H_V$. Likewise, each edge e may be an element of E and may be an instance of some class $C_e$, which itself may be an element of $C_E$ with respect to $H_E$. Optionally, the schema may contain additional constraints, which may be satisfied by G.

Figure 2A:
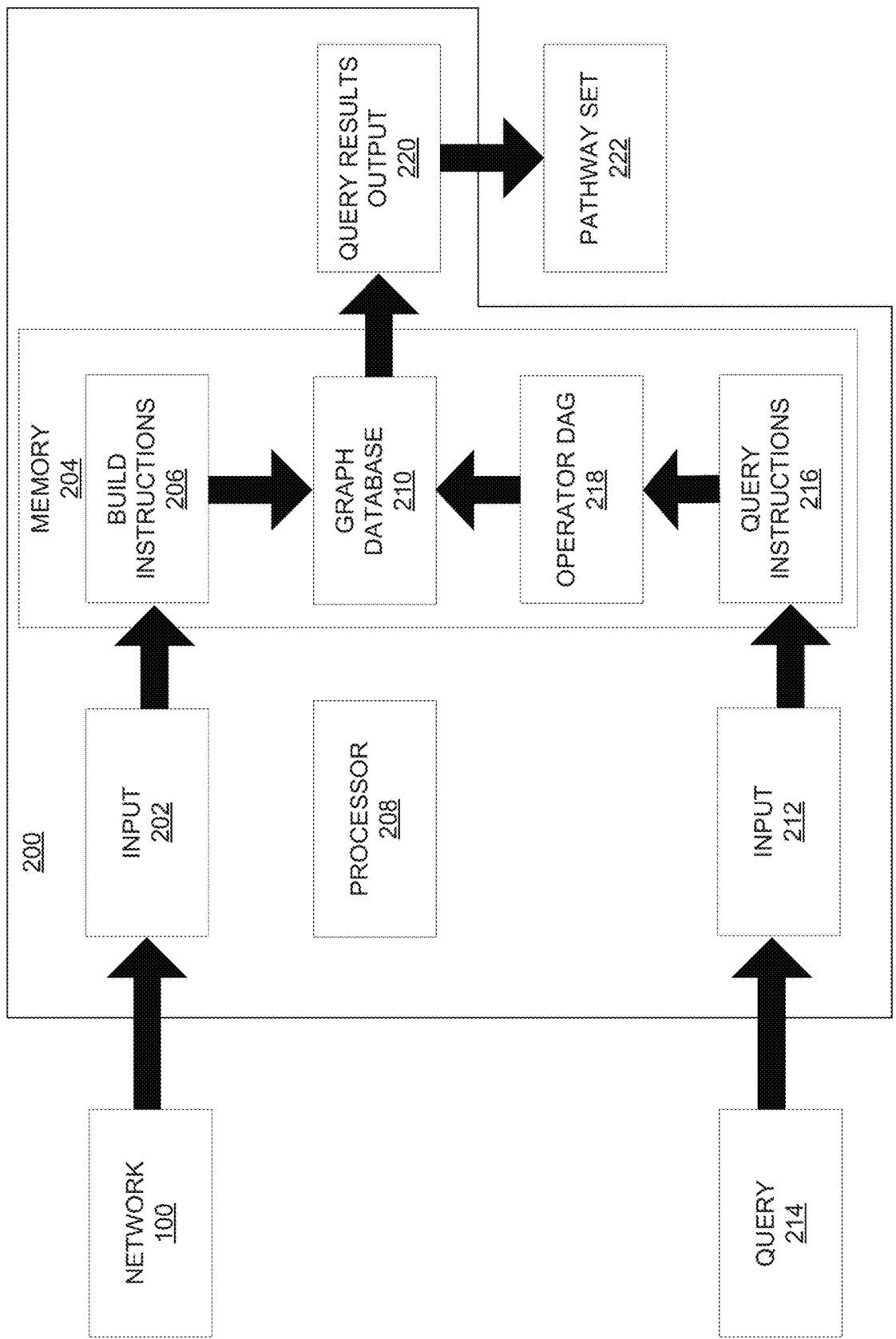
FIG. 2a illustrates a data flow for a system that may be used to create or query a graph database.
Figure 2B:
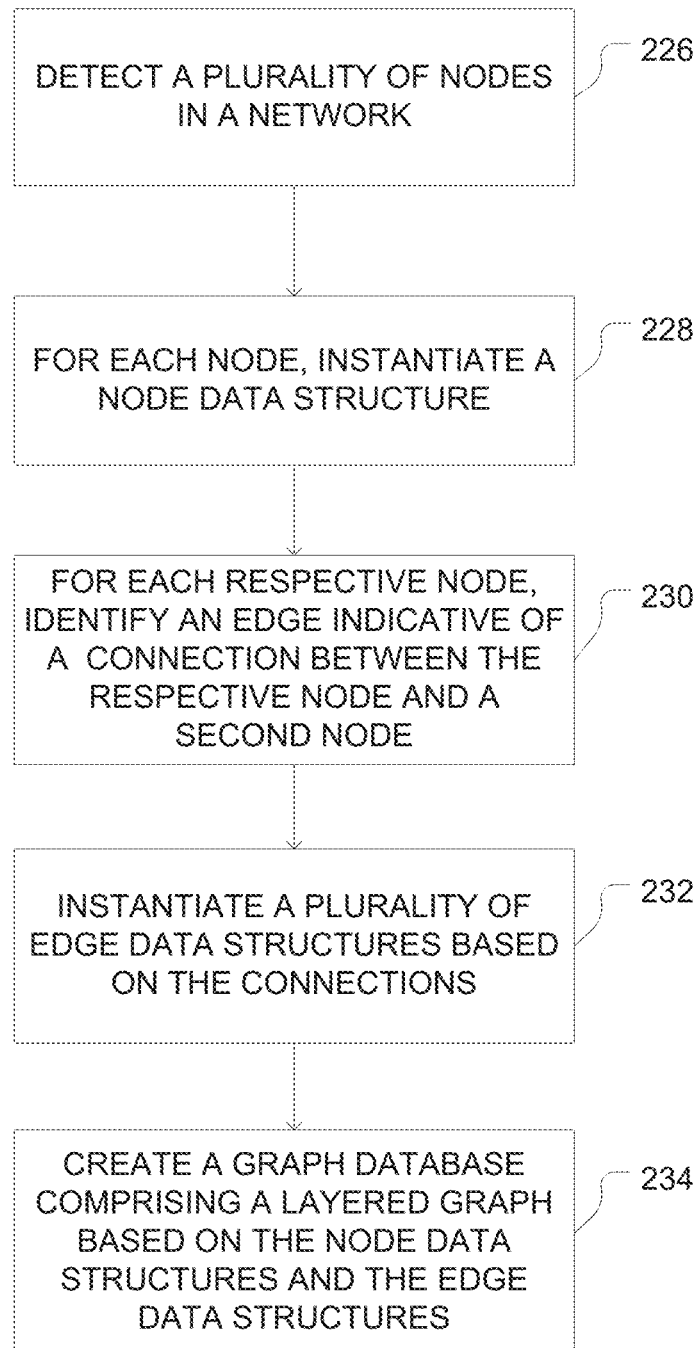
FIG. 2b is a flowchart of an exemplary method for creating a graph database.

FIG. 2b illustrates a method 224 that may be used by system 100 to create graph database 210 to store the network inventory of network 100. At step 226, method 224 may include detecting a plurality of nodes in network 100. Nodes may be any network entities, whether implemented in software, hardware, or a combination thereof. For example, referring to FIG. 1a, the nodes detected at step 226 may include VNFs 102 (including VNF:firewall 102a, VNF: DNS 102b, VNF: NAT 102c, and a VNF: web service 102d), VFCs 104 (including VFC: switch 104a, VFC: server 104b, VFC: proxy 104c, and VNF: web server 104d); VMs 106; VR 108; and physical hardware 110 (including hypervisor host 110).

At step 228, method 224 may include instantiating a node data structure for each of the nodes. Each node data structure may belong to one or more node classes. A class may be a pair (N, A) of a class name N and a set of attributes A. Each node data structure may be an instance of a node class. When a node is an instance of a node class, it may have the attributes of the class. A class definition may include constraints on the types of values of its attributes. A class definition may specify default values for its attributes. Node classes may include a VNF node class, a VFC node class, a VM node class, a VR node class, a physical node class, or the like.

The class hierarchy may be a partial order over the class set. In an aspect, a class hierarchy may be denoted by <isa>. Given two classes $C_1=(N_1, A_1)$ and $C_2=(N_2, A_2)$, if $C_1$<isa> $C_2$, $C_2$ may be a superclass of $C_1$, and $C_1$ may be a subclass of $C_2$. For example, if $C_2$ is the virtualization node class, whose attributes are that nodes of the class belong to a virtualization layer 136, and $C_1$ is the virtual machine node class, whose attributes are that the nodes are virtual machines, then the virtualization node class may be a superclass of the virtual machine node class and the virtual machine node class may be a subclass of the virtualization class. In such cases, $A_2$ may be a subset of $A_1$. That is, virtual machine nodes are a subset of nodes that belong to the virtualization layer. A node v may be an instance of a node class $C_V$ if it is an instance of $C_V$ or any subclass of $C_V$.

A node data structure may indicate the node type. For example, this may be indicated based on a node class to which it belongs. Additionally or alternatively, this may indicated by an attribute value of the node data structure. In an aspect, node data types may include a VNF type, a VFC type, a VM type, a physical node type, or the like.

Each node data structure may be associated with a layer of the layered graph. In an aspect, all nodes of the same class or the same node type may be part of the same layer. For example, VNF nodes 122 may be part of a service layer 132, and VFC nodes may be part of a logical layer 134, which may be below service layer 132. VM nodes 126 and VR nodes 127 may be part of virtualization layer 136, and host nodes 128 may be part of a physical layer 138.

The layers may be hierarchical, such that a node of layer i+1 is hosted on some node of layer i. For example, VM node 126 (of virtual layer 136) may be hosted on host node 128a (of physical layer 138). In an aspect, the lowest layer may be physical layer 138, which may comprise hardware, such as hypervisors, servers, or other machines, and the connections between them. The second layer may be virtualization layer 136, which may include VMs 106 or virtual routers 108 and the connections between them. The third layer may be the logical layer 134, which may include VFCs 104 that are deployed on VMs 106, and the connections between them. The fourth layer, service layer 132, may include the VNFs 102 and the connections between them. Different types of hierarchies may be defined in accordance with this disclosure.

At step 230, method 224 may include, for each respective node, identifying an edge. The edge may indicate a connection between the respective node and a second node. In an aspect, step 230 may include identifying all edges between nodes. Edges may indicate that two nodes are in communication with one another. Edges may indicate a physical connection between nodes. Edges may also indicate one node is deployed on another node, one node hosts another node, or one node is initiated on another node. For example, network 100 includes edges 112 and 114.

At step 232, method 224 may include instantiating a plurality of edge data structures based on the edges. That is, in network model 120, each edge 142, 144, 146, 148, 152, 154, and 156 may be associated with or based on an edge data structure. Each edge data structure may belong to one or more edge classes. Each edge data structure may be an instance of an edge class. When an edge data structure is an instance of an edge class, it may have the attributes of the class. A class definition may include constraints on the types of values of its attributes. A class definition may specify default values for its attributes.

In an aspect, the schema may include an edge-class hierarchy $H_E$. The class hierarchy may be a partial order over the class set. In an aspect, a class hierarchy may be denoted by <isa>. Given two classes $C_1=(N_1, A_1)$ and $C_2=(N_2, A_2)$, if $C_1$<isa> $C_2$, $C_2$ may be a superclass of $C_1$, and $C_1$ may be a subclass of $C_2$. For example, if $C_2$ is the intralayer edge class, whose attributes are that the target node of the edge is in a different layer than the source node of the edge, and $C_1$ is the virtualization-layer-to-logical-layer edge class, whose attributes are that the source node of the edge belongs to virtualization layer 136 and the target node of the edge belongs to logical layer 134, then the intralayer edge class may be a superclass of the virtualization-layer-to-logical-layer edge class and the virtualization-layer-to-logical-layer edge class may be a subclass of the intralayer edge class. In such cases, $A_2$ may be a subset of $A_1$. That is, virtualization-layer-to-logical-layer edges are a subset of intralayer edges. An edge e may be an instance of a node class $C_E$ if it is an instance of $C_E$ or any subclass of $C_E$. In another aspect, an edge class may contain a pair of source class and target class specifying the types of nodes that may be connected by an edge of that class. An edge class hierarchy may be such that if $C_1$<isa> $C_2$ for two edge classes, then for the source classes $C_{S1}$, $C_{S2}$, and target classes $C_{T1}$, $C_{T2}$, respectively, the following must hold: $C_{S1}$<isa> $C_{S2}$ and $C_{T1}$<isa> $C_{T2}$. An edge e may be an instance of an edge class $C_e$ if e is an instance of $C_e$ or of any subclass of $C_e$. If e is an instance of $C_e$ and the source node of e is $v_1$ and the target node of e is $v_2$, then $v_1$ may be an instance of the source class of $C_e$ and $v_2$ may be an instance of the target class of $C_e$.

In network hierarchy model 120, there may be two types of edges: intra-layer edges and inter-layer edges. Intra-layer edges connect nodes that are on the same layer. Such may edges represent the ability of nodes of the same layer to communicate with one another. For example, edges 142 may represent the ability of certain VNF nodes 122 to communicate with one another. Similarly, edges 144 may represent the ability of certain VFC nodes 124 to communicate with one another, and edges 146 may represent the ability of certain VM nodes 126 and certain VR nodes 127 to communicate with one another. In physical layer 138, edges 148 may represent the ability of certain host nodes 128 to communicate with one another. Additionally, because host nodes 128 may be physical components, edges 148 may represent physical connections.

Inter-layer edges may connect nodes on two different layers. In model 120, inter-layer edges may connect nodes on two adjacent layers, such as edges 152 that connect certain VNF nodes 122 to certain VFC nodes 124, edges 154 that connect certain VFC nodes 124 to certain VM nodes 126, and edges 156 that connect certain VM nodes 126 or certain VR nodes 127 to certain host nodes 128. An inter-layer edge, such as edges 152, 154, or 156, may represent that some node is deployed on or instantiated on some other node of a lower layer. For example, edges 156 may represent that certain VM nodes 126 or VR nodes 127 are deployed on some host nodes 128. Edges 154 may represent that certain VFC nodes 124 are instantiated on certain VM nodes 126.

Each edge data structure may indicate the source node and the target node of the edge. For example, the edge data structure related to edge 152b may identify node 122b and node 124c. For bidirectional connections, the identity of the source node and the target node may be interchangeable. For example, if edge 152b is being ascended, then the source node may be 124c and the target node may be 122b, and if edge 152b is being descended, then the source node may be 122b and the target node may be 124c. Bidirectional connections may include directed edges, where the relationship of the target node to the source node may depend upon a direction in which the edge is being followed. For example, if the target and source nodes of 156a are 126a and 128a, respectively, then edge 156a may indicate that the target node is Hosted_By the source node, and if the target and source nodes of 156a are 128a and 126a, respectively, then edge 156a may indicate that the target node Hosts the source node. In an aspect, an edge may not be bi-directional. For example, an edge may represent that a first node may transmit information to a second node, but that second node may not transmit information to first node along the edge. In such a situation, the target node and the source node of that edge may not be interchangeable.

At step 234, method 224 may include creating a graph database comprising a layered graph based on the plurality of node data structures and the plurality of edge data structures. This may comprise a network inventory. The graph database may store the node data structures and the plurality of edge data structures such that the graph database may be queried to discovery pathways in network 100. The results of a query of the database may be a set of pathways.

As discussed above, network inventory 120, graph database 210, and its data structures may comprise a schema. The schema may be robust enough to allow for different developers, working independently, to add new features to the schema. The schema may be designed such that a graph database built using the schema may be queried to access the complex entities and relationships in the network inventory at multiple levels of complexity, even without the user's knowledge of the different designers' approaches to adding features to the schema.

Optionally, one or more edge data structures or node data structures may be associated with a valid time interval. The valid time interval associated with a data structure may indicate a time period in which the corresponding edge or node is operative within network 100. Additionally or alternatively, a valid time interval associated with a data structure may indicate a time period in which the settings or conditions of the corresponding edge or node operative within network 100 are valid or applicable. Such information may be used in building a temporal network inventory. For example, a first layered graph associated with a first time may model network 100 as it exists at that first time. A first layered graph may be based on edge data structures and node data structures whose valid time intervals (or valid time intervals for certain settings or conditions of such data structures) include the first time. Graph database 210 may also include a second layered graph modeling network 100 as it exists at a second time. The second layered graph may be based on edge data structures and node data structures whose valid time interval includes the second time.

To store data in graph database 210 indicative of network 100 at different times, method 220 may optionally include receiving, via input 202, an update indicative of a change in network 100's structure. This may include the addition of a new edge, the addition of a new node, a change in the attributes of an existing edge or node, the removal of an existing edge or node, or the reintroduction of an edge or node that had been previously removed. Based on the change, method 220 may optionally include updating at least a portion of the data structures. For example, an attribute of an existing data structure may be changed, such as updating a valid time interval of the associated node or edge. As another example, a new edge data structure or a new node data structure may be instantiated.

For example, graph database 210 may include a special field (e.g., sys_period_) that may be added to the schema. This field (e.g., sys_period_) may describe the time period during which the associated record holds true. In an aspect, such time periods may be referred to as valid-time or transaction-time. In a valid-time temporal table, sys_period_may refer to the actual time that the record assertion holds in the real world. In a transaction-time temporal table, sys_period_refers to the time or times that the database processed the record. These distinctions may be relevant in certain uses or implementations of temporal graph databases. However, implementation for purposes of querying the graph database may not be relevant, as long as those conducting queries understand whether the temporal tables measure time as the valid-time or the transaction-time. Additionally or alternatively, graph database 210 may be bi-temporal, in that the records include both a valid-time record and a transaction-time record.

To implement a temporal dimension to graph database 210, a temporal extension may be used. For example, if there is a graph database V, a second table V_hist may be created, having the same fields as V. One or more triggers may be added to V. On insertion of a record (e.g., a node or edge) to V, the sys_period_field may be set to a tstzrange whose lower bound is the current system time and whose upper bound is infinite. On deletion of a record from V, the record in V has the upper bound of its sys_period_field set to the system time, and the record being deleted may be moved to V_hist. On update of a record in V, a copy of the record may be inserted into V_hist, with the upper bound of the sys-_period_field set to the system time. In V, the lower bound of the sys_period_field may be set to the system time; the upper bound may be infinite. Then the update may be applied to the record in V. V_hist may be a union of V. V may behave and be treated as a conventional, non-temporal table, while V_hist may provide temporal table queries.

The inventory (and graph database 210) may include information on items that are related to network 100 but are not part of network 100 itself, such as suppliers of physical components, customers, and their usage of network functions, or employees who are maintaining network 100. These data nodes may not be part of the hierarchical structure, but may be connected to nodes 122-128, and may be referenced by queries. Optionally, some nodes representing entities of network 100 may not be part of the hierarchy illustrated in FIG. 1b, such as nodes representing subnets. Connections in which at least one of the nodes is not in the network hierarchy 120 are represented by edges that are neither inter-layer nor intra-layer. For example, edges connecting a server and its supplier or a connection between a server and the subnet in which it is maintained are neither inter-layer nor intra-layer.

A pathway in a network inventory may be a sequence of alternating nodes and edges, such as $v_1, e_1, v_2, e_2, \ldots, v_{k-1}, e_{k-1}, v_k$, s, such that for each edge $e_i$, node $v_i$ and $v_{i+1}$ may be the source node and the target node, respectively, for all $1 \leq i \leq k-1$. In such pathway, the following node of node $v_i$ may be node $v_{i+1}$, and the following edge of $v_i$ is $e_i$. Similarly, $v_{i+1}$ and $e_{i+1}$ may be the following node and following edge of $e_i$. The following is an example pathway in FIG. 1b: $v_{122a}, e_{152a}, v_{124a}, e_{154a}, v_{126a}, e_{156a}$. For simplicity, such pathways in FIG. 1b can be referred to by the reference number only, as all nodes in FIG. 1b follow the notation style 12Xy, and all edges follow the notation style 15Xy. Thus, the sequence $v_{122a}, e_{152a}, v_{124a}, e_{154a}, v_{126a}, e_{156a}$ can be rewritten the form 122a, 152a, 124a, 154a, 126a, 156a. Other pathways in FIG. 1b may include the sequence 122b, 152b, 124c, 144c, 124d, 154d; the sequence 122e, 142c, 122d; the sequence 128b, 148a, 128a, 156b, 126b, 146c, 126c; and the sequence 124d.

A pathway may have a length L, which may be equal to the number of edges in the pathway. A single node $v_1$ may be a pathway having a length of 0, and a single edge $e_1$, either by itself or with its surrounding nodes $v_1, e_1, v_2$, may be pathway having a length of 1. In an aspect, a single edge $e_1$ may be syntactic sugar for the sequence $v_1$, $e_1$, $v_2$. Optionally, it may be advantageous for certain implementations to refer to edges by themselves, without any connecting nodes, as pathways. Referring again to FIG. 1*b*, the sequence 122*a* may be a pathway of length 0, as 122*a* is one node, and the sequence 122*a*, 152*a*, 124*a* may be a pathway of length 1, as 152*a* is an edge connecting nodes 122*a* and 124*a*. Optionally, in implementations where a single edge can make up a pathway, the sequence 152*a* may be a pathway of length 1.

In querying graph database 210, intra-layer edges (e.g., edges 142, 144, 146, and 148) may be distinguished from inter-layer edges (e.g., edges 152, 154, and 156). For example, to determine how nodes on the same layer are connected, only intra-layer edges should be used in the query. As another example, to determine what functions or virtual machines a certain machine hosts, or to determine on what machine a certain function is instantiated, only intra-layer edges should be used.

In querying graph database 210, different types of pathways may be used. For example, a descending pathway may be a pathway whose edges are only inter-layer edges from some layer to a lower layer. For example, sequence 122*c*, 152*c*, 124*d* is a descending pathway. As another example, an ascending pathway is a pathway whose edges are only inter-layer edges from one layer to a higher layer. For example, the reverse of the example descending pathway—124*d*, 152*c*, 122*c*—is an example of an ascending pathway, as is the sequence 126*d*, 154*d*, 124*d*, 152*d*, 122*d*. Ascending pathways and descending pathways are both vertical pathways. A horizontal pathway is a pathway whose edges are only intra-layer edges. For example, the sequence 124*a*, 144*a*, 124*b* is a horizontal pathway, as is the sequence 128*b*, 148*e*, 128*d*.

Other types of pathways besides vertical pathways and horizontal pathways may be used in a query. For example, the sequence 128*a*, 156*b*, 126*b*, 146*c*, 126*c* is neither a vertical nor a horizontal pathway, as it includes both inter-layer edges (e.g., 146*c*) and intra-layer edges (e.g., 156*b*).

In an aspect, it may be advantageous to understand how a horizontal pathway is expressed in a different level (e.g., a higher or lower level). For a horizontal pathway $v_1, \ldots, v_k$ in layer i, and some lower layer j<i, let $u_1, \ldots, u_k$ be nodes in layer j such that for each $v_x$, node $u_x$ is reachable by a descending pathway from $v_x$, for $1 \leq x \leq k$. Induced pathways in layer j may be pathways that start in $u_1$, end in $u_k$, and go via all the nodes $u_1, \ldots, u_k$, and may go via additional nodes in layer j. Similarly, for an induced pathway in a higher level h, where h>i, an induced pathway may contain nodes $w_1, \ldots, w_k$, such that for each $w_x$, node $w_x$ is reachable by an ascending pathway from $v_x$, for $1 \leq x \leq k$.

For example, referring to FIG. 1*b*, a first pathway in logical layer 134 may be 124*a*, 144*a*, 124*b*, 144*b*, and 124*c*. Then, the nodes in this pathway may be 124*a*, 124*b*, and 124*c*. Nodes that are reachable in virtualization layer 136 by a descending pathway from each of those nodes may include nodes 126*a* (reachable by a descending pathway from 124*a*), 126*b* (reachable by a descending pathway from 124*b*), and 126*c* (reachable by a descending pathway from 124*c*). Thus, an induced pathway of 124*a*, 144*a*, 124*b*, 144*b*, and 124*c* may be 126*a*, 146*a*, 126*b*, 146*c*, 126*c*. In a search, the user may define a structure of induced pathways to explore.

FIG. 1*b* may be a snapshot in time of the network entities (nodes) and connections (edges). A temporal inventory may record changes in the network (e.g., different nodes or edges), and it may be possible to query a temporal inventory for information related to a network configuration at different past times. In a temporal inventory, for all nodes and edges, the times when they were valid may be stored. Formally, a time interval may be a pair of times, such as $[t_1, t_2]$. A time t may be contained in the interval $[t_1, t_2]$ if $t_1 \leq t \leq t_2$. Each node and each edge may be associated with a sequence of validity intervals specifying when it was valid. A node or an edge may be valid during the times that are contained in one of its respective validity intervals, and may be invalid during other times. Thus, for a temporal inventory, the network inventory and its graphical representation, like that in FIG. 1*b*, may change as a function of time.

A valid pathway p at time t is a pathway whose nodes and edges are all valid at time t. For example, host node 128*a* hosts, at time t, all VM nodes 126, VFC nodes 124, and VNF nodes 122 that may be reachable from 128*a* by a valid ascending pathway at time t. For example, if FIG. 1*b* represents valid nodes and edges at time t, then the following may be some of the valid ascending pathways from 128*a*: (1) 128*a*, 156*a*, 126*a*, 154*a*, 124*a*, 152*a*, 122*a*; (2) 128*a*, 156*b*, 126*b*, 124*b*; and (3) 128*a*, 156*c*, 126*c*, 154*c*, 124*c*, 152*b*, 122*b*. Then, host node 128*a* hosts, at time t, 126*a*, 125*b*, 126*c*, 124*a*, 124*b*, 124*c*, 122*a*, and 122*b*.

Temporal queries of graph database 210 may include time-slice queries or time range queries.

Figure 2C:
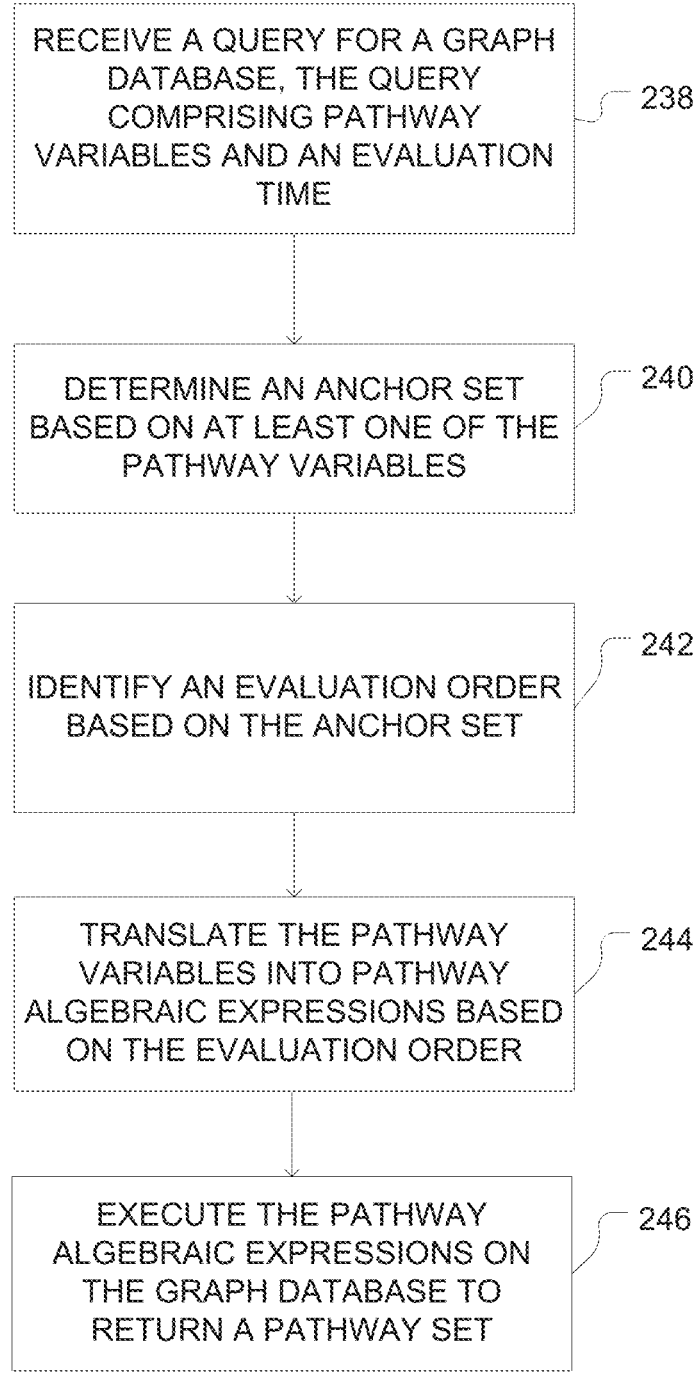
FIG. 2c is a flowchart of an exemplary method for conducting a time-slice query of a graph database.

FIG. 2*c* is a flowchart of an exemplary method 236 that may be used by system 200 for conducting a time-slice query of graph database 210. At step 238, system 200 may receive a query 214 via user input 212. Query 214 may be a time-slice query that executes on the network inventory as it existed at some point in the past; the point in the past may be identified in query 214 as an evaluation time. Query 214 may be written in a query language. A query language for querying the graph database represented in FIG. 1*b* is disclosed. In an aspect, the query language may consider pathways as first-class citizens. The input and the output of query 214 in the query language may each be a set of pathways, so that the query language is closed under composition.

As an example throughout the following description, query 214 having an evaluation time of 2016-07-15 2:00 AM may be:
RETRIEVE P
FROM HORIZONTAL P (@ 2016-07-15 2:00 AM), DESC P1 (@ 2016-07-15 2:00 AM), DESC P2 (@ 2016-07-15 2:00 AM)
WHERE P1 MATCHES 'n(id=124*a*)→n( )→n( )' AND P2 MATCHES 'n(id=124*e*)→n( )→n( )' AND source(P)=target(P1) AND target(P)=target (P2) AND P MATCHES 'n( ){0, 10}'.

Optionally, query 214 may have more one evaluation time. That is, the evaluation time for each variable P, P1, and P2 in the FROM clause may differ from one another.

If the evaluation is the same, the syntax of query 214 may be simplified as follows:
AT '2016-07-15 2:00 AM'
RETRIEVE P
FROM HORIZONTAL P, DESC P1, DESC P2
WHERE P1 MATCHES 'n(id=124*a*)→n( )→n( )' AND P2 MATCHES 'n(id=124*e*)→n( )→n( )' AND source(P)=target(P1) AND target(P)=target (P2) AND P MATCHES 'n( ){0, 10}'.

In an aspect, a retrieved pathway (e.g., the results of query 214 outputted by query results output 218) may comply with a structure definition, such as a regular pathway expression. In an aspect, a regular pathway expression may comprise edge patterns or node patterns. A node pattern may be denoted by n(ϕ), where ϕ may be a list of constraints on attributes, and may be satisfied by nodes whose attributes satisfy the constraints. A node pattern with an empty list of constraints—e.g., n( )—may be satisfied by any node. As an example, the following may define a node pattern that is satisfied by active virtual machines with at least 4 GB of memory:

n(class isa 'VM', status='active', memory≥4)

Edge patterns may be denoted by e(ϕ), where ϕ may be a list of constraints on attributes, and may be satisfied by edges whose attributes satisfy the constraints. An edge pattern with an empty list of constraints—e.g., e( )—may satisfied by any edge. As an example, the following may define an edge pattern that is satisfied by ascending edges whose target node is a VNF node:

e(class isa 'ASC', target isa n(class is a VNF))

In addition to the node pattern n(ϕ) and the edge pattern e(ϕ), regular pathway expressions may include other styles. For example, for a regular pathway expression p, the repetition of p—which may be expressed as $p\{i_1, i_2\}$, where $i_1$ and $i_2$ are integers such that $0 \le i_1 \le i_2$—may itself be another regular pathway expression. As another example, for two regular pathway expression $p_1$ and $p_2$, the concatenation of $p_1$ and $p_2$—which may be expressed as $p_1 \rightarrow p_2$ or $(p_1 \| p_2)$—may itself be another regular pathway expression. As another example, for two regular pathway expression $p_1$ and $p_2$, the disjunction of $p_1$ and $p_2$—which may be expressed as $(p_1 | p_2)$—may itself be another regular pathway expression.

As part of querying a network, a determination of when a pathway may be satisfied by a given regular pathway expression may be made. As an example, pathway p may be a pathway of the form $v_1, e_1, v_2, e_2, \ldots, v_{k-1}, e_{k-1}, v_k$. Pathway $p_1$ may satisfy $p\{i_1, i_2\}$ if $p_1$ comprises at least $i_1$, and at most $i_2$, consecutive subsequences that satisfy p. For example, n(class isa 'VM'){3,5} may be satisfied by pathways that go via 3, 4, or 5 consecutive nodes of class VM (e.g., nodes 126). In an aspect, if $i_1=0$—e.g., $p\{0, i_2\}$—then p may be optional. Thus, n(class isa 'VM'){0,5} may be satisfied by pathways that go via 1, 2, 3, 4, or 5 consecutive nodes of class VM (e.g., nodes 126) or by pathways that do not contain any nodes of class VM. Similarly, the expression e(class isa 'DependsOn'){2,3} may be satisfied by a pathway that goes via 2 or 3 consecutive edges of class 'DependsOn.'

As another example, a given pathway expression may include a concatenation. A determination of whether a pathway satisfies a concatenation may be made in multiple ways. For example, pathway p may satisfy $p_1 \rightarrow p_2$ if there is a node $v_i$ in p that such that the subsequence $v_1 \ldots, v_i$ satisfies $p_1$ and either the subsequence $v_{i+1}, \ldots v_k$ or the subsequence $e_i, v_{i+1}, \ldots v_k$ satisfies $p_2$. Additionally or alternatively, pathway p may satisfy $p_1 \rightarrow p_2$ if there is an edge $e_i$ in p that such that the subsequence $v_1 \ldots, v_i, e_i$ satisfies $p_1$ and either the subsequence $v_{i+1}, \ldots v_k$ or the subsequence $e_{i+1}, v_{i+1}, \ldots v_k$ satisfies $p_2$. In an aspect, following a node pattern or an edge pattern can be an edge pattern or a node pattern. For example, the pathway expression n(class isa 'VM')→e(class isa 'HostedOn')→e(class isa 'DependsOn')→n(class isa 'VR')→n(class isa 'VM') may be satisfied by pathways that start at a VM node (e.g., node 126), go via an edge of class HostedOn, and then onto an edge of class Depends ON, to a node of class VR (e.g., node 127) and then to a node of class VM (e.g., node 126) on any edge of any class.

As another example, a given pathway expression may include a disjunction. Pathway p may satisfy $(p_1 | p_2)$ either if p satisfies $p_1$ or if p satisfies $p_2$.

The syntax of the query language may vary, as long as the syntax provides a mechanism for querying an inventory for a set of pathways. The examples provided herein are for illustration purposes only, and should not be construed as limiting the scope of the disclosed query language or any other feature of this disclosure.

A first-degree query (also referred to as a "query" or "query 214") may return a set of pathways. In an aspect, a first-degree query may identify one or more of the following elements: (1) a first element, which may be one or more pathways (or nodes or edges, which by themselves may be considered pathways) for which to solve, (2) a second element, which may be one or more views of a set of pathways over which one or more pathway variables, such as the first element, may be applied, and (3) a third element, which may include one or more conditions of one or more pathway variables. For example, query 214 received at step 238 of method 236 may comprise pathway variables.

In an aspect, the query language may use a syntax similar to that of SQL. For example, a RETRIEVE clause may identify the first element, a FROM clause may identify the second element, and a WHERE clause may identify the third element.

For example, the following query including pathway variable P:

RETRIEVE P
FROM ASC P
WHERE source(P).id=128a AND length(P)=3;
may find the ascending pathways of length 3 from node 128a, which may be the pathways to VFC nodes 124 that are deployed on node 128a. In this query, the first element may be the pathway variable P, the second element may be the set of all ascending pathways as a view of the set of all pathways, and the third element may be that pathway P has a source of node 128a and a length of 3. As another example, the following query:

RETRIEVE P
FROM PATHWAYS P
WHERE source(P).id=128a AND length(P)=3;
may find all pathways of length 3 from node 128a, which would include pathways regardless of whether they were ascending, descending, horizontal, or of any other configuration. As another example, the following query:

RETRIEVE N
FROM NODES N
WHERE N MATCHES 'n(isa VM)';
may find all VM nodes, such as 126a, 126b, 126c, 126d, 126e, and 126f. As a node by itself may comprise a pathway, the results of this query may be a set of pathways, where each pathway is of length 0 and may comprise a single node.

Another query may retrieve edges. For example, the following query:

RETRIEVE E
FROM EDGES E
WHERE E MATCHES 'e(isa intra-layer)';
may find all intra-layer edges, such as edges 152, 154, and 156. As an edge by itself may comprise a pathway, the results of this query may be a set of pathways, where each pathway is of length 1 and may comprise a single edge. Alternatively, this query may return a set of pathways having length 1, where each pathway contains one intra-layer edge and the edge's target node and source node.

The node classes and subclasses and the edge classes and subclasses may be used to define a variable, such as by using the class name. For example, in the above query, e(isa intra-layer) defines the edge as belonging to the intra-layer class and in the preceding query, n(isa VM) defines that node as belonging to the VM class.

A regular form of a query may be when each pathways is associated with a regular pathway expression. In an aspect, a query can be written in regular form or it can be transformed into one. In this manner, a query can be input using a syntax (such as a user-friendly syntax, such as SQL) and may be translated into a regular pathway expression. This may be accomplished by rewriting conditions of the query in a regular pathway expression form. For example, the condition length(p)≤k, may be translated into a condition P MATCHES 'n( ){0,k}' where n( ) is a node pattern that is satisfied by any node. For example, the query:
RETRIEVE P
FROM ASC P
WHERE source(P).id=128a AND length(P)=2;
may be translated into:
RETRIEVE P
FROM ASC P
WHERE P MATCHES n(id=128a)→n( )→n( );

Also, queries may use views of all horizontal or descending pathways, such as by using the syntax HORIZONTAL and DESC, respectively, as is used by query 214. For example, these views may be included as part of the second element, or, in the exemplary syntax, the FROM clause, which contains pathway variables P, P1, and P2:
RETRIEVE P
FROM HORIZONTAL P, DESC P1, DESC P2
WHERE source(P1).id='124a' AND length(P1)=2 AND source (P2).id='124e' AND length (P2)=2 AND source (P)=target (P1) and target (P)=target (P2) AND length P<=10;
may find pathways on the physical layer between the hosts of two VNF nodes 124a and 124e.

The view HORIZONTAL P may limit P to horizontal pathways, and the views DESC P1, and DESC P2 may limit P1 and P2 to descending pathways. This query may be solved by finding pathway P1 from 124a and pathway P2 from 124e to physical layer 138, which may indicate on which host node 128 each VNF node 124a and 124e is deployed (e.g., node 128a and node 128c, respectively) and then finding horizontal pathways p between the two discovered hosts. This query uses a join to connect the three pathway variables, P, P1, and P2, by comparing the target of one pathway to the source of another pathway. The above query may be rewritten in regular form, such as:
RETRIEVE P
FROM HORIZONTAL P, DESC P1, DESC P2
WHERE P1 MATCHES 'n(id=124a)→n( )→n( )' AND P2 MATCHES 'n(id=124e)→n( )→n( )' AND source(P)=target(P1) AND target(P)=target (P2) AND P MATCHES 'n( ){0, 10}';

A query having multiple variables may be written using subqueries. In an aspect, the syntax for subqueries may follow the same structure as the syntax for queries. For example, the preceding query may be written as:
RETRIEVE P
FROM HORIZONTAL P WHERE source(P)=target(
RETRIEVE P1
FROM DESC P1
WHERE P1 MATCHES 'n(id=124a)→n( )→n( )') AND target(P)=target(
RETRIEVE P2
FROM DESC P2
WHERE P2 MATCHES 'n(id=124e)→n( )→n( )') AND P MATCHES 'n( ){0, 10}');

A query may also use Boolean functions. For example, an EXISTS clause in a query may return 'TRUE' (or 1) if that clause is true, and a NOT EXISTS clause (e.g., a negation clause) may return 'TRUE' (or 1) if that clause is false. In an aspect, negation may be expressed by using NOT EXISTS. For example, the following query:
RETRIEVE N
FROM NODES N
WHERE N MATCHES 'n(isa VM)' AND NOT EXISTS (
RETRIEVE P
FROM ASC P
WHERE source(P)=N AND length(P)<=2);
may find VM nodes 126 that do not host any VFC nodes 124 or VNF nodes 122 (as there are no ascending pathways from the returned VM nodes). This syntax assumes that ASC P only refers to pathways with lengths greater than or equal to 1, so that pathways of length zero—which, by definition, any node N may qualify—would not cause the NOT EXISTS query to return false. If the syntax uses ASC P such that it includes pathways of length 0, the same query could be expressed by adding "AND length (P)>0" to the WHERE clause of the RETRIEVE P subquery, such as:
RETRIEVE N
FROM NODES N
WHERE N MATCHES 'n(isa VM)' AND NOT EXISTS (
RETRIEVE P
FROM ASC P
WHERE source(P)=N AND length(P)<=2 AND length(P) >0);

Negation may be used to discover the shortest pathways between given nodes. For example, the following query:
RETRIEVE P
FROM P
WHERE P MATCHES 'n(id=128a)→n( ){0,5}→n (id=124d)' AND NOT EXISTS
(RETRIEVE P1
FROM P1
WHERE P1 MATCHES 'n(id=128a)→n( ){0,8}→n (id=124d)' AND length (P1)<length (P))
may return the shortest pathways between nodes 128a and 124d.

A query may use or identify induced pathways. A set of induced pathways of a given pathway may be defined by a query element, such as a pair of induction patterns. Induction patterns may be represented as regular pathway expressions. One induction pattern may be used for the vertical traversal, to move between layers. Another induction pattern may be used for the horizontal traversal in the new layer. A query for induced pathways may be expressed by the operation ZOOM_IN(P, RPE_v, RPE_h) or ZOOM_OUT(P, RPE_v, RPE_h), where P may be a pathway variable representing the sequence $v_1, e_1, v_2, e_2, \ldots, v_{k-1}, e_{k-1}, v_k$. RPE_v may be a vertical pathway expression, and RPE_h may be a horizontal pathway expression. The pathway expressions RPE_v and RPE_h may be used as follows for computing induced pathways. For a zoom-in operation, at a first step, the nodes reachable by $v_i$ from a pathway that matches RPE_v are computed, for each $v_i$ of P. For a zoom-out operation, at a first step, the nodes from which $v_i$ is reachable by a pathway that matches RPE_v are computed, for each $v_i$ of P. Let $Z_1, \ldots Z_k$ denote the result node sets from the first step. That is, for a zoom-in operation, $Z_j$ may be the set of nodes accessible by $v_j$ from a pathway that satisfies RPE_v, and for a zoom-out operation, $Z_j$ may be the set of nodes from which $v_j$ is accessible from a pathway that satisfies RPE_v. An induced path is a sequence $p_i = w_i, \ldots w_m$ such that there is a subsequence of k nodes $w_{i1}, \ldots w_{ik}$, where $w_{ij}$ is in $Z_j$, for all $1 \leq j \leq k$, and each pair $w_{ij}, w_{ij+1}$ is connected by a horizontal pathway that matches RPE_h. In other words, for each pair $w_{ij}, w_{ij+1}$ there is a subsequence of consecutive nodes and edges $w_{ij}, e_{ij}, \ldots e_{ij+1}$ in $p_i$ that forms a horizontal pathway matching RPE_h. For example, the following induced-pathway query:

RETRIEVE ZOOM_IN(P, 'n( )→n(isa VFC)→n(isa VM)', 'n( ){0,4}')
FROM HORIZONTAL P
WHERE P MATCHES 'n(id=122a)→n(id=122c)→n(id=122d)'

In this query, the nodes reachable by $v_i$ (e.g., the nodes of P) by a pathway that matches 'n( )→n(isa VFC)→n(isa VM)' is as follows: For $v_1$ (122a), $Z_1$ includes 126a; for $v_2$ (122c), $Z_2$ includes 126d; and for $v_3$ (122d), $Z_3$ includes 126d. Next, the induced paths that include $Z_1$, $Z_2$, or $Z_3$, where each pair of nodes from $Z_1$, $Z_2$, or $Z_3$ may be connected by a horizontal pathway that matches n( ){0,4} are identified. Thus, if px is an induced pathway returned by the above query, px includes 126a and 126d (the nodes in $Z_1$, $Z_2$, or $Z_3$). Then, each of 126a and 126d may be connected by a horizontal pathway that satisfies n( ){0,4}. For example, $p_x$ may be the sequence 126a, 146a, 126b, 146c, 126c, 146d, 127, 146e, 126d. In this pathway $p_x$, 126a is connected to 126d by a pathway of length 3 (which satisfies n( ){0,4}). Another induced pathway may be the sequence 126a, 146b, 126c, 146d, 127, 146e, 126d, where 126a is connected by a pathway of length 2 (which satisfies n( ){0,4}). In this manner, this exemplary induced-pathway query may drill down from service layer 132 to find VM nodes 126 that are connected to the VNF nodes 122 of pathway P through a vertical pathway of VFC, VM. Then, on virtualization layer 136 it may find horizontal pathways having lengths less than or equal to 4 that connect those VM nodes.

Generally, an induced-pathway query may return a pathway whose first node and last node are part of any of $Z_j$. In an aspect, modified induced pathway queries may return pathways that start or end with nodes besides those nodes in any of $Z_j$. For example, another induced pathway $p_x$ may be the sequence 126b, 146a, 126a, 146b, 126c, 146d, 127, 146e, 126d; and another induced pathway $p_x$ may be the sequence 126a, 146b, 126c, 146d, 127, 146e, 126d, 146f, 126e, 146g, 126f. Generally, an induced-pathway query may return a horizontal query. As another option, a modified induced-pathway query may be used to find induced pathways that are not horizontal. For example, an induced pathway $p_x$ may be 128a, 156a, 126a, 146a, 126b, 146c, 126c, 146d, 127, 146e, 126d.

At step 240, method 236 may include determining one or more anchor sets based on the pathway variables of query 214. The anchor sets may also be based on the one or more evaluation times. An anchor set may be a set of nodes that may be used as an initial node set in the identification of pathways. Thus, for time-slice queries, the anchor sets may be determined based on the one or more evaluation times, such as the evaluation time associated with the respective pathway variables. The source of the anchor sets (e.g., v_history) may be determined based on the one or more evaluation times.

The size of an anchor set may vary. For example, the anchor set size may be based on the size of the network or the size of the query. In an aspect, using a larger anchor set for a larger network may provide more accurate or more reliable query results. Optionally, the anchor set size may be based on the available computation resources. In an aspect, a larger anchor set may require more computation resources, so queries performed when resources are in high demand, or queries performed where the speed of determining the query results is of greater importance, may use smaller anchor sets. Given an anchor set A and a length limit L, an anchored length-limited set of pathways ("ALLP") may be a set of pathways such that all pathways in the set go via a node in A their length does not exceed L.

The query variables of query 214:
AT '2016-07-15 2:00 AM'
RETRIEVE P
FROM HORIZONTAL P, DESC P1, DESC P2
WHERE P1 MATCHES 'n(id=124a)→n( )→n( )' AND P2 MATCHES 'n(id=124e)→n( )→n( )' AND source(P)=target(P1) AND target(P)=target (P2) AND P MATCHES 'n( ){0, 10}';

may include P, P1, and P2. The anchor set for each pathway variable of query 214 may be determined using historical graph database 210. An anchor set may be directly defined, such as for variable P1, which has a condition that its source node be node 124a, and variable P2, which has a condition that its source node be node 124e. Thus, the anchor set for P1 may be node 124a, and the anchor set for P2 may be node 124e.

The syntax of query 214 may differ. In another exemplary query language syntax, to pose a "pathway retrieval at time t" query, an "AT TIME t" clause may be included in the RETRIEVE clause. For example, query 214 may take the form:

RETRIEVE P AT TIME '2016-07-15 2:00:00'
FROM HORIZONTAL P, DESC P1, DESC P2
WHERE P1 MATCHES 'n(id=124a)→n( )→n( )' AND P2 MATCHES 'n(id=124e)→n( )→n( )' AND source(P)=target(P1) AND target(P)=target (P2) AND P MATCHES 'n( ){0, 10}';

At step 242, method 236 may include identifying an evaluation order based on the anchor set. An evaluation order, which may comprise a graph $G_A(Q)$ whose nodes are the variables of query Q. For example, for query 214, the evaluation order may comprise a graph $G_A(Q)$ whose nodes are P, P1, and P2. Variables whose anchor set is directly defined, like P1 and P2, may be considered roots. Pairs of variables with a join condition may connected by an edge in $G_A(Q)$. For example, source(P)=target(P1) may be a join condition, and target(P)=target(P2) may be another join condition. Thus, P and P1 may be connected by an edge, and P and P2 may be connected by another edge. An evaluation order may be an order that is computed by a traversal over $G_A(Q)$ in which nodes that are not roots can only be visited if they are neighbors of a visited node. Thus, in $G_A(Q)$ for query 214, the node P may only be visited if it is the neighbor of a visited node, which means that at least one of P1 or P2 must be visited before P is visited. Thus, an order in which P is after P1 or P2 may be used as an evaluation order for query 214. That is, the order may be (1) P1, P2, P; (2) P1, P, P2; (3) P2, P1, P; or (4) P2, P, P1. Method 236 may be optimized by choosing one potential evaluation order that leads to a more efficient evaluation of the query than another potential evaluation order.

At step 244, method 236 may include translating the pathway variables into pathway algebraic expressions. In general, a pathway variable p whose anchor set may be A and whose length limit is L, the pathway algebraic expression may be of the form $$E_p = \varepsilon^{j}(\varepsilon^{L-j}(A)),$$

where ε' may be an reverse extension (discussed below), ε may be an extension (discussed below), and j may be determined according to the location of the anchor. For example, j may equal 0 when the anchor A is the source, and j may equal L when the anchor A is the target. For a pathway variable $p_x$ that uses an anchor extracted from p, the pathway algebraic expression may be of the form $$E_{px}=\varepsilon^j{}_{\$2}(\varepsilon^{L-j}{}_{\$2}(\eta_n(E_p))),$$

where j is the location of the anchor in $p_x$ and n is the extracted node (e.g., source node, target node, or node i).

A pathway algebra may operate on sets of pathways or tables of pathways. A table of pathways may be a table whose rows are tuples of pathways. A tuple may be a list of pathways that are related in some sense. For example, a table of pathways may be used where the query comprises multiple pathway variables. Returning to exemplary query 214,
AT '2016-07-15 2:00 AM'
RETRIEVE P
FROM HORIZONTAL P, DESC P1, DESC P2
WHERE P1 MATCHES 'n(id=124a)→n( )=n( )' AND P2 MATCHES 'n(id=124e)→n( )→n( )' AND source(P)=target(P1) AND target(P)=target (P2) AND P MATCHES 'n( ){0, 10}';
a table of pathways may be constructed where each column is a set of pathways associated with one of the pathway variables (e.g., P1, P2, and P), and where pathways in a row are related to one another. For example, in a given row, the source of P may be the target of P1 or the target of P may be the target of P2.

In pathway algebra, for unary operators, the operand may be a set of pathways or a table of pathways, and, for binary operators, the operand may be a pair of pathway sets or a pair of tables.

In pathway algebra, an extension operator is a unary operator that may be used to extend pathways by appending to them an edge, or an edge and its target node. The extension operator may receive a set of pathways or a table of pathways. For time-slice queries, the extension operator may include an additional constraint. When a pathway is extended using the extension operator, the added-on node or edge must be checked for existence at the evaluation time.

When the extension operator is applied to a set of pathways S, it may be denoted by ε(S). The extension operator may add S to the result and then add the following pathways. For each pathway p in S and edge e in the network, such that the source of e is equal to the target of p, the concatenation of p and e—that is, (p∥e)—or, in cases where the extension operator appends an edge and its target node to the pathway, (p∥e, $e_{target}$) may be added to the result. For example, considering FIG. 1b, if the set of pathways S is the single pathway p=128a, 156a, 126a, then ε(S) may be equal to the set comprising (1) p; (2) 128a, 156a, 126a, 146b, 126c; (3) 128a, 156a, 126a, 146a, 126b; and (4) 128a, 156a, 126a, 154a, 124a.

When the input of an extension operator is a table T and the operation is to be applied to column i of the table, the operation may denoted by $\varepsilon_{\$i}(T)$. In such case, a row r whose pathway in column i can be extended by k different edges may yield k+1 rows of result—one for each extension plus the original tuple with the unexpanded pathway.

An ascending extension operator $\varepsilon_{asc}$ may extend pathways by merely ascending edges, and the descending extension operator $\varepsilon_{desc}$ may extend pathways by merely descending edges. Similarly, the horizontal extension operator $\varepsilon_{horizontal}$ may extend pathways by merely horizontal edges.

An extension operator may be implemented based on different criteria. For example, DependsOn( )→may extend a pathway by a descending edge (and optionally its target node). DependsOn( )→may be implemented as:

```
create TEMP table tmp_extend_block_r1_g0 as(
    select T.uid_list || ARRAY[ H.id_ ] as uid_list,
        H. target_id_ as curr_uid,
    from DependsOn H, tmp_Select_node T
    where H.source_id_ = T.curr_uid
);
```

For a time-slice query, the DependsOn( )→operator may be modified by changing the source in the "from" clause to a historical table. For example, as shown below, the FROM clause may include "DependsOn_history." Like the difference between V and V_hist, the difference between DependsOn and DependsOn_history is that the latter relates to a temporal record. Thus, the DependsOn_history operator may be used to query temporal records. Thus, the time-slice query may also include a constraint to the "where" clause that the output be valid a t the time interval:

```
create TEMP table tmp_extend_block_r1_g0 as(
    select T.uid_list || ARRAY[ H.id_ ] as uid_list,
        H. target_id_ as curr_uid,
    from DependsOn_history H, tmp_Select_node T
    where H.source_id_ = T.curr_uid
    and H.sys_period_ @> "2016-07-14 16:30-04"::timestamptz
);
```

In pathway algebra, a reverse extension operator is a unary operator that may be used to extend pathways by appending the pathways to an edge when the target of the edge is equal to the source of the pathway. Reverse extension operators may be implemented similarly to extension operators, such as in the Postgresl examples above, or in other database languages. The reverse extension operator may work similar to the extension operator, except that instead of concatenating an edge to a pathway, a pathway is concatenated to an edge, or an edge and its source node. For each pathway p in S and edge e in the network, such that the target of e is equal to the source of p, the concatenation of e and p—that is, (e∥p)—or, in cases where the reverse extension operator appends the pathway to an edge and its source node, (p∥e, $e_{target}$), may be added to the result. A reverse extension operation may be denoted by ε'. For example, considering FIG. 1b, if the set of pathways S is the single pathway p=128a, 156a, 126a, then ε'(S) may be equal to the set comprising (1) p; (2) 128b, 148a, 128a, 156a, 126a; (3) 126c, 156c, 128a, 156a, 126a; (4) 126b, 156b, 128a, 156a, 126a; and (5) 128c, 148d, 128a, 156a, 126a. When the input of a reverse extension operator is a table T and the operation is to be applied to column i of the table, the operation may denoted by $\varepsilon_{\$i}'(T)$. In such case, a row r whose pathway in column i can be extend by k different edges may yield k+1 rows of result—one for each extension plus the original tuple with the unexpanded pathway.

Pathway algebraic expressions may allow an edge to be extended by an edge or a node to be extended by a node. If a first edge is extended by a second edge, then the target of the first edge must be a node that is the source of the second edge. Since a pathway may not have a "dangling edge," the intermediate node between the first edge and the second edge must exist at the query time-slice. If a first node is extended by a second node, system 200 may check to confirm that the edge connecting the first node to the second node also exists at the time-slice. In both cases, extending a first edge by a second edge or extending a first node by a second node, the intermediary node or edge, respectively, may be considered an implicit extension. Thus, system 200 may include a check to confirm such implicit extensions are valid at the time-slice. An example implementation of this is as follows:

```
create TEMP table tmp_extend_block_1_r4_g0 as(
select T.uid_list || ARRAY[ E.id_, H.id_] as
uid_list,
    H.id_ as curr_uid,
    from Edge_history E, Host_history H,
    tmp_extend_block_1_r3_g0 T
    where E.source_id_ = T.curr_uid and H.id_ = E.target_id
      AND E.id_ <> ANY(T.uid_list) and H.id_ <> ANY(T.uid_list)
      AND E.sys_period @> '2016-07-14 16:00:00-04'::timestamptz
      AND
H.sys_period @> '2016-07-14 16:00:00-04'::timestamptz
);
```

In pathway algebra, a node extraction operator is a unary operator that extracts a single node, such as the source node, the target node, or the jth node, from each pathway in a given set. The node extraction operator may be applied to a set or on a column i of a table. The node extraction operator may add a new column that associates each pathway to its extracted node. The new column may contain a set of nodes and, hence, a set of pathways (when a single node may be considered pathway). The node extraction operator is denoted by $\eta$, such that extracting a source node, target node, or jth node from a set may be denoted as $\eta_{source}(S)$, $\eta_{target}(S)$, or $\eta_{node(j)}(S)$, respectively, and extracting a source node, target node, or jth node from a column i of T may be denoted as $\eta_{\$i,source}(T)$, $\eta_{\$i,target}(T)$, or $\eta_{\$i,node(j)}(T)$, respectively. The new column added by node extraction operator may be the last column, so the new column of a node extraction operator applied to set S is column 2, and the new column of a node extraction operator applied to a table T having n columns, the new column will be column n+1.

For non-temporal queries, the extraction operator may be used to extract a record (e.g., a node, an edge, a pathway) from graph database 210. For example, the extraction operator for Host(id_='23456') may be implemented by the following Postgresql expression

```
create TEMP table tmp_Select_node as(
    select ARRAY[id_] as uid_list, id_ as curr_uid,
    from Host v
    where (H.id_ = '23456')
);
```

Postgresql provides SQL extensions which simplify the expression of the PRE operators, but one can mechanically transform these operators into other SQL variants.

For time-slice queries, the extraction operator may have additional functionality to select the anchor that is valid at the proper evaluation time. To transform a non-temporal anchor operator into a temporal anchor operator, the FROM clause and the WHERE clause may be modified. In the FROM clause, for every range variable that is sourced from a table that stores graph data, the source may be changed to the history version of that table. That is, "from Host v" may be changed to "from Host_history v." In the WHERE clause, for every range variable that is sourced from a table that stores graph data, a constraint may be added to return only results at the indicated time-slice. That is, "where (H.id_='23456')" may be rewritten as "where (H.id_='23456') and H.sys_period &>"2016-07-14 16:30-04"::timestamptz."

Pathway algebra may include standard operators of relational algebra, such as the Cartesian product (denoted by ×), projection (denoted by $\pi$), selection (denoted by $\sigma$) and set operators (unions, intersections, complements), may be applied on tables of pathways consistent with relational algebra.

For example, the following pathway algebraic expression may find VMs that are not the source of any ascending pathway by defining variable N as VM nodes, finding the nodes of N with ascending pathways, and using set difference to discard those nodes of N with ascending pathways:

$$N \leftarrow node(class='VM')$$

$$N \setminus \pi_{\$2}(\eta_{source}(\varepsilon_{asc}^2(N)))$$

Thus, for query 214, the pathway algebraic expressions from step 244 may be:

$$E_{P1} = \varepsilon_{desc}^2(node(id=124a))(at\ 2016\text{-}07\text{-}15\ 2\text{:}00\ AM)$$

$$E_{P2} = \varepsilon_{desc}^2(node(id=124e))(at\ 2016\text{-}07\text{-}15\ 2\text{:}00\ AM)$$

$$E_{PX} = \varepsilon_{horizontal}^{10}(\eta_{target}(E_{P1}))(at\ 2016\text{-}07\text{-}15\ 2\text{:}00\ AM),$$

where $E_{P1}$, $E_{P2}$, and $E_{PX}$ are pathway algebraic expressions for variables P1, P2, and P, respectively.

In the above example, the pathway algebraic expressions follow the $E_p = \varepsilon^{-j}(\varepsilon^{L-j}(A))(evaluation\_time)$ format, where the $E_{PX}$ formula uses the anchor set from $P_1$. However, $P_2$ may be another anchor set for P. Thus, another pathway algebraic expression for the P variable may be: $E_{PY} = \varepsilon'_{horizontal}^{10}(\eta_{target}(E_{P2}))$ (at 2016-07-15 2:00 AM). Whether P1 or P2 is used as the anchor set of the pathway algebraic expression for P may depend upon the evaluation order. For example, whichever pathway variable is used as the anchor set of P must precede P in the evaluation order. Of the possible evaluation orders—(1) P1, P2, P; (2) P1, P, P2; (3) P2, P1, P; or (4) P2, P, P1—if the evaluation order (2) is selected, then P1 may be the anchor set for P, and if evaluation order (4) is selected, then P2 may be the anchor set for P. If the evaluation order (1) or (3) is selected, either P2 or P1 may be the anchor set for P, as both are evaluated prior to P. For this example, algebraic expression $E_{PX}$ is used, but $E_{PY}$ may be been used to achieve the same query results.

Expressions that may be computed for the different pathways may be combined using a Cartesian product, and selections may be applied with the conditions in the WHERE clause. For example, the pathway expressions for $E_{P1}$, $E_{P2}$, and $E_{PX}$ may be combined as the expression:

$$E_{P1} \times E_{P2} \times E_{PX}$$

$\varepsilon_{desc}^2(node(id=\mathbf{124}a))(at\ 2016\text{-}07\text{-}15\ 2\text{:}00\ AM) \times \varepsilon_{horizontal}^{10}(\eta_{target}(\varepsilon_{desc}^2(node(id=\mathbf{124}a))(at\ 2016\text{-}07\text{-}15\ 2\text{:}00\ AM))(at\ 2016\text{-}07\text{-}15\ 2\text{:}00\ AM) \times \varepsilon_{desc}^2(node(id=\mathbf{124}e))(at\ 2016\text{-}07\text{-}15\ 2\text{:}00\ AM)$.

This pathway algebraic expression may return a table whose first column includes set of pathways defined by $E_{P1}$, a second column that includes a set of pathways defined by $E_{P2}$, and a third column that includes a set of pathways defined by $E_{PX}$, whose rows are tuples of each of the pathways of $E_{P1}$, each of the pathways of $E_{P2}$, and each of the pathways of $E_{PX}$, where all of the elements were valid at time 2016-07-15 2:00 AM.

Optionally, optimization techniques may be applied to speed up the evaluation of queries. As a first example, pathways that may only be computed to provide an anchor for some other pathway and are then discarded may be called a navigational anchor variable. A navigational anchor variable may be a pathway variable that appears in the FROM clause without appearing in the RETRIEVE clause and where one its nodes may be an anchor of another pathway. This may require extracting the anchor, but there may be not need to keep the pathway from which the anchor is extracted. Thus, the operator $\eta$ can be combined with the projection $\pi$, which may leave only the column of the extracted nodes after the operation. Additionally or alternatively, the Cartesian product of the pathway expressions may only include as operands those pathway expression whose variables are not navigational anchor variables.

An example of a navigational anchor variable in query 214 is P1, if the algebraic expression for P uses the algebraic expression of P1 as the anchor (e.g., $E_{PX}$). Thus, rather than using the Cartesian product $E_{P1} \times E_{P2} \times E_{PX}$, the Cartesian product may be limited to $E_{P2} \times E_{PX}$, as follows:

$$\sigma_{length=2}(\varepsilon_{desc}^2(node(id=124e))(at\ 2016\text{-}07\text{-}15\ 2:00\ AM)) \times \varepsilon_{horizontal}^{10}(\eta_{target}(\varepsilon_{desc}^2(node(id=124a))\ (at\ 2016\text{-}07\text{-}15\ 2:00\ AM)))(at\ 2016\text{-}07\text{-}15\ 2:00\ AM)$$

Selection operators may be applied to the expression based on conditions in the WHERE clause of query 214, and then a projection operator may be applied to the expression to retrieve the set of pathways that satisfy the variable in the RETRIEVE clause of query 214.

The WHERE clause of query 214 includes a number of conditions. For example, query 214 requires that both P1 and P2 are pathways of length 2. But, $E_{P1}$ and $E_{P1}$ may both return pathways whose lengths are less than or equal to 2. Thus, $E_{P1}$ and $E_{P2}$ can be modified to include a selection for pathways whose lengths equal 2:

$$E_{P1} = \sigma_{length=2}(\varepsilon_{desc}^2(node(id=124a))(at\ 2016\text{-}07\text{-}15\ 2:00\ AM))$$

$$E_{P2} = \sigma_{length=2}(\varepsilon_{desc}^2(node(id=124e))(at\ 2016\text{-}07\text{-}15\ 2:00\ AM))$$

Inserting these updated $E_{P1}$ and $E_P$ expressions in to the Cartesian product $E_{P2} \times E_{PX}$ may result in:

$$\sigma_{length=2}(\varepsilon_{desc}^2(node(id=124e))(at\ 2016\text{-}07\text{-}15\ 2:00\ AM)) \times \varepsilon_{horizontal}^{10}(\eta_{target}(\sigma_{length=2}(\varepsilon_{desc}^2(node(id=124a))(at\ 2016\text{-}07\text{-}15\ 2:00\ AM))))(at\ 2016\text{-}07\text{-}15\ 2:00\ AM)$$

The identification of pathways with a length requirement may be another grounds for optimizing the evaluation. For example, when, for pathway variable p, there exists a length limit length(p)=L, there may be no need to compute pathways whose length is less than L, only to discard them when the selection operator is applied. In such case, the extend operator may be combined with a selection operator, such that in each application of $\varepsilon(S)$ or $\varepsilon'(S)$, only extensions of pathways of S are added to the result. The unexpanded original pathways of S may be discarded.

Since query 214 provides that P can be pathways having a length up to 10, no such length-dependent selection may be necessary for $E_P$, as the maximum length of a pathway returned by $\varepsilon_{horizontal}^{10}$ is 10. However, query 214 requires that P include pathways whose source nodes are the target nodes of P1 and whose target nodes are the target of P2. Query 214 includes the condition that the source of the pathways of P equal the targets of the pathways of P1. The condition that pathways P have a source node that is the target node of P1 may be satisfied by $E_{PX}$. The condition that the targets of pathways P equal the targets of the pathways P1 may be incorporated into the algebraic expression using a selection operator, as follows:

$$\sigma_{target(\$1)=target(\$2)}(\sigma_{length=2}(\varepsilon_{desc}^2(node(id=124e))) \times \varepsilon_{horizontal}^{10}(\eta_{target}(\sigma_{length=2}(\varepsilon_{desc}^2(node(id=124a)))))$$

Finally, a projection may be applied on the pathway variables in the retrieve clause—that is, P—as follows:

$$\pi_{\$1}(\sigma_{target(\$1)=target(\$2)}(\sigma_{length=2}(\varepsilon_{desc}^2(node(id=124e))) \times \varepsilon_{horizontal}^{10}(\eta_{target}(\sigma_{length=2}(\varepsilon_{desc}^2(node(id=124a)))))))$$

In another example, for queries that may contain a NOT EXISTS subquery, for each row of the Cartesian product, the anchors that may be used in the subquery may be extracted using the node extraction operator $\eta$, and the sub-query may be computed with respect to them. The condition may be evaluated as true of the result of the subquery is non-empty and false if the result of the subquery is empty.

As another example of optimization techniques, when an extend operator is applied, it may be desired to only apply it using specific edges. For instance, when a pathway is limited to be horizontal, ascending, or descending, the extend operator may be executed with respect to merely horizontal, ascending, or descending edges, respectively. A more intricate case may be when the computed pathways should match a given regular pathway expression x. In that case, a state machine (DFA) $A_x$ that accepts only pathways complying with x may be built, and only extensions by edges that are a valid step on the automation may be executed.

At step 246, method 236 may include executing the pathway algebraic expressions on graph database 210 to identify a first pathway. As stated above, valid evaluation orders may include: (1) P1, P2, P; (2) P1, P, P2; (3) P2, P1, P; or (4) P2, P, P1. The evaluation order at step 242 may be selected from the valid evaluation orders. Optionally, how the pathway algebraic expressions are executed may depend on the evaluation order. For this example, assume that evaluation order (1) was chosen. Thus, the first pathway algebraic expression to be executed may be $E_{P1}$.

Executing $E_{P1} = \sigma_{length=2}(\varepsilon_{desc}^2(node(id=\mathbf{124a}))(at\ 2016\text{-}07\text{-}15\ 2:00\ AM))$ on database 210 may return $S_{P1} = \{\mathbf{124a, 154a, 126a, 156a, 128a}\}$.

Then, $E_{P2}$ may be executed on database 210. Executing $E_{P2} = \sigma_{length=2}(\varepsilon_{desc}^2(node(id=\mathbf{124e})))$ may return $S_{P2} = \{\mathbf{124e, 154e, 126e, 156e, 128c}\}$ Then, the results of $E_{P1}$ and $E_{P2}$ may be inserted into the expression for pathway P:

$\pi_{\$1}(\sigma_{target(\$1)=target(\$2)}(S_{P2} \times \varepsilon_{horizontal}^{10}(\eta_{target}(S_{P1})))(at\ 2016\text{-}07\text{-}15\ 2:00\ AM)))$, which may be executed on database 210.

Since the only target node of $S_1$ is 128a, and the only target node of 128b is 128c, the results of executing $\pi_{\$1}(\sigma_{target(\$1)=target(\$2)}(\varepsilon_{horizontal}^{10}(\eta_{target}(S_{P1})))(at\ 2016\text{-}07\text{-}15\ 2:00\ AM) \times S_{P2}))$ may include the set $S_P = \{\mathbf{128a, 148a, 128b, 148b, 128c; 128a, 148a, 128b, 148e, 128d, 148c, 128c; 128a, 148d, 128c}\}$. Executing the pathway algebraic expression on graph database may return a pathway set, in this case, $S_P$.

The result of a first-degree may be a set of pathways. A first-degree query may be applied to the results of another first-degree query. This may maintain the composability of the query language. Additionally, second-degree queries may be applied to first-degree queries. The difference between a first-degree query and a second-degree query may be that the results of a second-degree query may not a set of pathways. Because the query language considers pathways a first-class citizen, second-degree pathways may be considered outside of the query language.

Optionally in implementations where a single edge may not be considered a pathway, queries for returning edges (such as the exemplary query above that retrieves intra-layer edges), may be considered second-degree queries. Similarly, in implementations where a single node may not be considered a pathway, queries for returning nodes (such as the exemplary query above that returns VM nodes), may be considered second-degree queries.

For example, second-degree queries may return other data related to a set of pathways (e.g., the results of a first-degree query), such as the number of pathways in the set, the types of nodes or edges in the set, or any other data. The following examples illustrate how second-degree queries may function.

For example, a second-degree query may comprise a count function that may count the number of retrieved pathways. For example, the following second-degree query:
COUNT(
RETRIEVE P
FROM ASC P
WHERE source(P)=128a AND length(P)<3)
may return 7, since the first-degree query returns 7 pathways: (1) 128a; (2) 128a, 156a, 126a; (3) 128a, 156a, 126a, 154a, 124a; (4) 128a, 156b, 126b; (5) 128a, 156b, 126b, 154b, 124b; (6) 128a, 156c, 126c; and (7) 128a, 156c, 126c, 154c, 124c.

As another example, a second-degree query may include an intersect function that may extract the nodes (or edges) that may be shared by all the returned pathways. An intersect function may be useful for identifying a potential common (or single) point of failure, which may be helpful for troubleshooting. For example, the following second-degree query:
INTERSECT_NODES(
RETRIEVE P
FROM DESC P
WHERE target(P)=126d AND LENGTH P=2)
may return 124d and 126d, since the first-degree query returns pathways (1) 122c, 152c, 124d, 154d, 126d; and (2) 122d, 152d, 124d, 154d, 126d, whose shared nodes are 124d and 126d. Similarly, the following second-degree query:
INTERSECT_EDGES(
RETRIEVE P
FROM DESC P
WHERE target(P)=126d AND LENGTH P=2)
may return 154d, which is the only edge shared by the two returned pathways. In an aspect,
INTERSECT( ) may be the combination of INTERSECT_NODES( ) and
INTERSECT_EDGES( ), so that the following second-degree query:
INTERSECT_NODES(
RETRIEVE P
FROM DESC P
WHERE target(P)=126d AND LENGTH P=2)
may return 124d, 126d, and 154d.

As another example, a second-degree query may include a minimum length function that may find the length of the shortest pathway in the set. For example, the following second-degree query:
MIN_LENGTH(
RETRIEVE P
FROM HORIZONTAL P
WHERE target (P)=126a AND SOURCE(P)=126c)
may return 3, since of the two horizontal pathways starting at 126a and ending at 126c—126a, 146a, 126b, 146c, 126c and 126a, 146b, 126c, the shortest pathway is the latter, with a length of 1.

As another example, a second-degree query may include a join function over two pathway sets, which may return a concatenation of every pathway of the first set and every pathway of the second set whenever the target of the first pathway is equal to the source of the second pathway. For example, the following second-degree query:
JOIN (
(RETRIEVE P
FROM HORIZONTAL P
WHERE source (P)=126c AND length (P)>=1),
(RETRIEVE P1
FROM ASC P1
WHERE source(P1)=126d AND length (P1)>=1))
requires computing the query for P and the query for P1. P may include the following pathways: (1) 126c, 146d, 127; (2) 126c, 146d, 127, 146e, 126d; (3) 126c, 146d, 127, 146e, 126d, 146f, 126e; (4) 126c, 146d, 127, 146e, 126d, 146f, 126e, 146g, 126f; (5) 126c, 146c, 126b; (6) 126c, 146c, 126b, 146a, 126a; and (7) 126c, 146b, 126a. P1 may include the following pathways: (A) 126d, 154d, 124c, 152c, 122c; (B) 126d, 154d, 124d; and (C) 126d, 154d, 124d, 152d, 122d. Then, JOIN (P, P1) may produce the set of the following concatenations (2, A), (2, B), (2, C), or the following pathways (1) 126c, 146d, 127, 146e, 126d, 154d, 124c, 152c, 122c; (2) 126c, 146d, 127, 146e, 126d, 154d, 124d; and (3) 126c, 146d, 127, 146e, 126d, 154d, 124d, 152d, 122d.

As another example, a second-degree query may include an extract function that extracts elements present in any of the pathways in the set. EXTRACT_NODES (P) may return all nodes that are present in any of the pathways of set P. For example, applying a second degree function to the first-degree query used in the COUNT( ) to identify all nodes in the set of pathways returned by the first-degree query may be written as:
EXTRACT_NODES(
RETRIEVE P
FROM ASC P
WHERE source(P)=128a AND length(P)<3)
This query may return all the nodes found in any of the seven pathways P: 128a; 126a; 124a, 126b, 124b; 126c, and 124c. Note that, because nodes may be considered pathways of length 0, that the EXTRACT_NODES query may be considered as a first-degree query. Similarly, a second-degree query applied to the same first-degree query may identify all edges that are included in the set of pathways returned by the first-degree query. This may be written as:
EXTRACT_EDGES(
RETRIEVE P
FROM ASC P
WHERE source(P)=128a AND length(P)<3)
This second-degree query may return all the nodes found in any of the seven pathways P: 156a, 154a, 156b, 154b, 156c, and 154c. Note that, because edges may be considered pathways of length 1, that the EXTRACT_EDGES query may be considered as a first-degree query. Similarly, second-degree queries may return information other than nodes or edges. For example, as discussed above, a network inventory may include information on items that are related to network 100 but are not part of network 100 itself, such as suppliers of physical components, customers, and their usage of network functions, or employees who are maintaining network 100. As an example, different extract functions may extract this type of data. For example, an extract function may be used to identify employees responsible for maintaining one or more nodes or edges of a pathway set P. Likewise, different intersect functions may be used to identify employees that are responsible for at least one node or one edge in every pathway of set P.

Figure 2D:
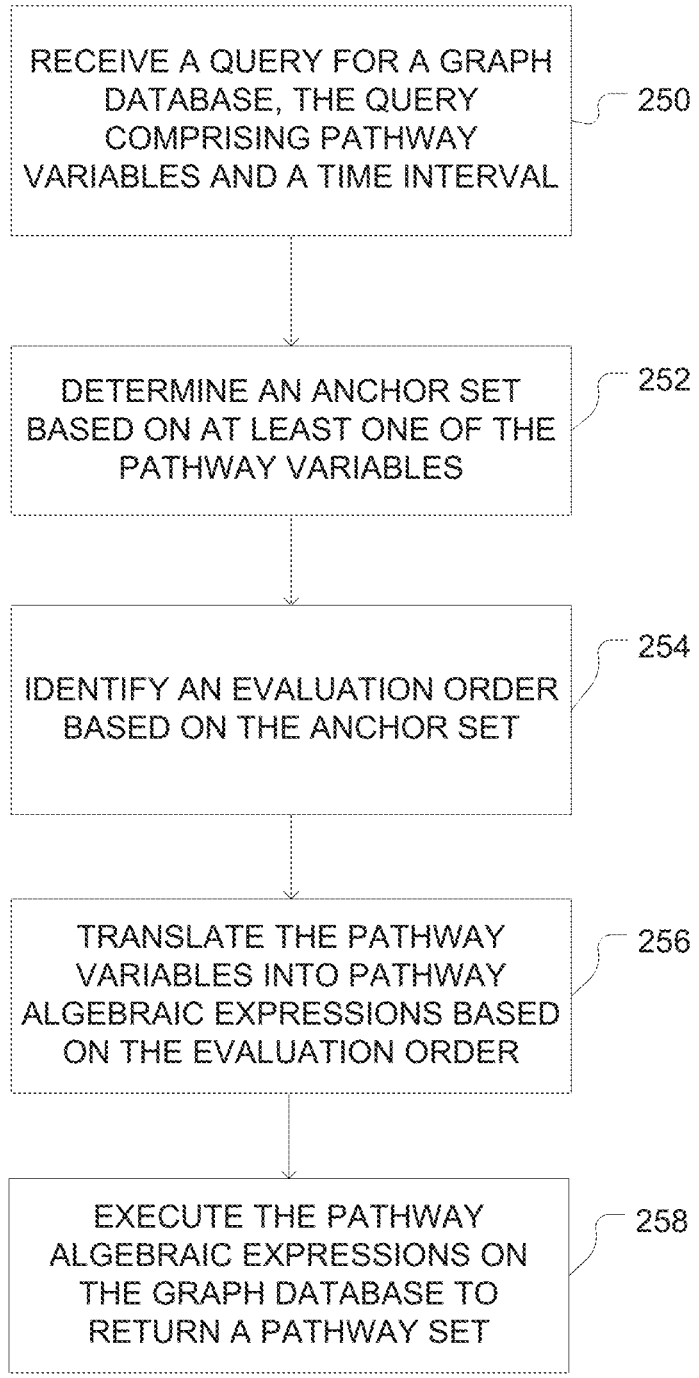
FIG. 2d is a flowchart of an exemplary method for conducting a time-range query of a graph database.

FIG. 2d is a flowchart of an exemplary method 248 that may be used by system 200 for conducting a time-range query of graph database 210. A time-range query may return paths that satisfy a query during a particular time range. At step 250, system 200 may receive a query 214 via user input 212. Query 214 may be a time-range query that executes on the network inventory as it existed over a time interval, which may be identified in query 214. Query 214 may be written in a query language. A query language for querying the graph database represented in FIG. 1b is disclosed. In an aspect, the query language may consider pathways as first-class citizens. The input and the output of query 214 in the query language may each be a set of pathways, so that the query language is closed under composition.

This type of query, which may be called a "time-range query," may have inputs of a time interval $[t_1, t_2]$ and a query Q. Time-range queries may include open time-range queries, whose answer may be the result of posing Q over a network consisting of nodes and edges that, at any point t in $[t_1, t_2]$, were valid. Time-range queries may include closed time-range queries, whose answer may be the result of posing Q over a network consisting of nodes and edges that were each valid at every point t in $[t_1, t_2]$. In addition to the pathways, time-range query may return time intervals for when each of the returned pathways was valid.

In the exemplary query language syntax, to pose a time-range query, a BETWEEN clause may be included in the RETRIEVE clause. For example, the query
RETRIEVE P
FROM PATHS P
WHERE P MATCHES VNF(name="DNS")→[Hosted( )]{1,5}→VM(status='green')→Host( ) and length(P)<=5
may be converted into a time-range query that executes on data valid between 2:00 AM on Jul. 15, 2016, and 8:00 PM on Jul. 15, 2016, as follows:
RETRIEVE P
FROM PATHS P (@ '2016-07-15 2:00 am': '2016-07-15 8:00 am')
WHERE P MATCHES VNF(name="DNS")→[Hosted( )]{1,5}→VM(status='green')→Host( ) and length(P)<=5

Just as a time-slice query may have a different evaluation time for one or more of the pathway variables, a time-range query may have a different time-slice or time-range for one or more of the pathway variables. An example of a query with multiple time ranges is as follows:
RETRIEVE P, Q
FROM PATHS P (@ '2016-07-15 2:00 am': '2016-07-15 9:00 am'), Q (@ '2016-07-15 3:00 am': '2016-07-15 9:00 am')
WHERE P MATCHES DNS_VNF( )→[Hosted( )]{1,5}→VM(status='green')→Host( ) AND Q MATCHES MME_VNF( )→[Hosted( )]{1,5}→VM(status='green')→Host( ) AND length(P)<=5 AND length(Q)<=5 and target(P)=target(Q)

The output of such a query may contain pairs of paths, each pair including a path from P and a path from Q, respectively. This this case, all paths of P may be joined with all paths of Q, regardless of the time during which those paths may be valid. For example, a path P1 that may be valid only between 3:00 am and 4:00 am on Jul. 15, 2016 may be joined with a path Q1 that not valid between 3:00 am and 4:00 am on Jul. 15, 2016. To constrain time ranges for the join, query 214 may include additional predicates. In contrast, if P and Q are to be evaluated for the same time interval, all joins may have an implicit predicate that both joined paths may be asserted at an overlapping interval of time. An example of a query where P and Q are evaluated for the same time interval may be as follows:
BETWEEN '2016-07-15 2:00 am' AND '2016-07-15 9:00 am'
RETRIEVE P, Q
FROM PATHS P, Q
WHERE P MATCHES DNS_VNF( )→[Hosted( )]{1,5}→VM(status='green')→Host( ) AND Q MATCHES MME_VNF( )→[Hosted( )]{1,5}→VM(status='green')→Host( ) AND length(P)<=5 AND length(Q)<=5 and target(P)=target(Q)

At step 252, method 248 may include determining one or more anchor sets based on the pathway variables of query 214. The anchor sets may also be based on the one or more time intervals of query 214. An anchor set may be a set of nodes that may be used as an initial node set in the identification of pathways. Thus, for time-range queries, the anchor sets may be determined based on the one or more time intervals, such as the time intervals associated with the respective pathway variables. The source of the anchor sets (e.g., v_history) may be determined based on the one or more evaluation times.

At step 254, method 248 may include identifying an evaluation order based on the anchor set. An evaluation order, which may comprise a graph $G_A(Q)$ whose nodes are the variables of query Q. Variables whose anchor set is directly defined may be considered roots. Pairs of variables with a join condition may connected by an edge in $G_A(Q)$. An evaluation order may be an order that is computed by a traversal over $G_A(Q)$ in which nodes that are not roots can only be visited if they are neighbors of a visited node.

Similar to step 244 of method 236, step 256 may include translating the pathway variables into pathway algebraic expressions based on the evaluation order. Similar to step 246 of method 236, step 248 may include executing the pathway algebraic expressions on graph database 210 to return a pathway set, with certain modifications to allow for querying graph database 210 over a time interval.

As discussed above, executing pathway algebraic expressions may include using operators, such as an extraction operator and an extension operator. As discussed above, for temporal queries (as opposed to non-temporal queries that may be restricted to querying current, rather than historical, records of a graph database), certain modifications may be made to certain operators.

Like time-slice queries, an extraction operator used for a time-range query may have an additional constraint compared to non-temporal queries. For time-slice queries, the extraction operator may require that it return only records that are valid at the evaluation time. For time-range queries, the extraction operator may require that it return only records that are valid at some point in the time-range. Thus, the extraction operator must be modified to ensure this additional constraint is met.

An extraction operator may be modified as follows: In the FROM clause, for every range variable that is sourced from a table that stores graph data, the source may be changed to the history version of that table. That is, "from Host v" may be changed to "from Host v_history." In the WHERE clause, for every range variable that is sourced from a table that stores graph data, a constraint may be added to return only results valid at some point in the indicated time interval, and if more than one range variable is sourced from a table that stores graph data, add a constraint to ensure that the time range of a record from the range variable overlaps with the time range of records from every other range variable that is sourced from the table that stores the graph data. Thus, extraction operator for a time-range query may be implemented as:

```
create TEMP table tmp_Select_node as(
    select ARRAY[id_] as uid_list, id_ as curr_uid,
    H.sys_period_ as ts_range,
    from Host_history H
    where (H.id_ = '23456')
    and H.sys_period && tstzrange('2016-07-14
    16:00:00-04', '2016-07-14 16:30:00-04')
);
```

Extension operators may similarly be modified to account for time intervals in time-range queries. For time-range queries, the extension operator may include an additional constraint. When a pathway is extended using the extension operator, the added-on node or edge must be checked for existence at some point in the time interval. Thus, a DependsOn( )→operator for a time-range query may be implemented as:

```
create TEMP table tmp_extend_block_r1_g0 as(
    select T.uid_list || ARRAY[ H.id_] as uid_list,
    H. target_id_ as curr_uid,
    H.sys_period_ * T.ts_range as ts_range,
    from DependsOn_history H, tmp_Select_node T
    where H.source_id_ = T.curr_uid
    and H.sys_period_ && tstzrange('2016-07-14
    16:00:00-04', '2016-07-14 16:30:00-04')
    and H.sys_ period_ && T.ts_range
```

If the pathway algebraic expression includes an implicit extension (e.g., an intervening node when a first edge is extended by a second edge or an intervening edge when a first node is extended by a second node), the validity of that intervening node or edge may also be confirmed to be within the time interval.

For example, the following extends a path terminating at a node by a Host node.

```
create TEMP table tmp_extend_block_1_r4_g0 as(
    select T.uid_list || ARRAY[ E.id_, H.id_] as
    uid_list,
    H.id_ as curr_uid,
    E.sys_period_ * H.sys_period_ * T.ts_range as ts_range
    from Edge_history E, Host_history H,
    tmp_extend_block_1_r3_g0 T
    where E.source_id_ = T.curr_uid and H.id_ = E.target_id_
        AND E.id_ <> ANY(T.uid_list) and H.id_ <>
        ANY(T.uid_list)
        AND E.sys_period_ && tstzrange('2016-07-14 16:00:00-04',
    '2016-07-14 16:30:00-04')
        AND H.sys_period_ && tstzrange ('2016-07-14 16:00:00-04',
    '2016-07-14 16:30:00-04')
        AND H.sys_ period_ && T.ts_range AND E.sys_ period_
        && T.ts_range
        AND H.sys_ period_ && E.sys_ period_
);
```

If an edge is extended by an edge, then in non-temporal queries and in time-slice queries, there may be no need to perform a database access to find the intermediate node because its existence is implied by the graph database constraint that there are no dangling edges. However in a time-range query, the node might have experienced multiple updates during the intersection of the time ranges of the two edges. Therefore the node may be fetched from the database and processed using procedures and predicates which are analogous to the procedures and predicates illustrated by the edge-by-edge extension example.

At step 258, method 248 may include executing the pathway algebraic expressions on graph database 210 to return a pathway set. The pathway set may comprise a pathway and an associated time range during which the pathway is valid. The associated time range may overlap with the time interval.

First-level queries and second-level queries may belong to a first category of queries that may be used to obtain information from a network inventory. A second category of queries, which may be referred to as temporal queries, may be used to obtain information from a temporal network inventory. At least some portion of a temporal query, such as the query results or the query conditions, may have a temporal component. Since a temporal network inventory may be a type of network inventory (e.g., a network inventory that, for at identifies a valid time interval of at least one of the nodes or edges in the network), the first category of queries may be applied to temporal network inventories, but the second category of queries may not be applied to network inventories that do not include any valid time intervals for any of the nodes or edges.

Other time-based queries may be used. Another example of a temporal query may be a "first/last time when" query that can be posed to determine when a certain condition began or ended. A "first/last time when" query may be formulated as an EXISTS or NOT EXISTS subquery and may return the first or last time that condition was satisfied. For example,
LAST TIME WHEN EXISTS (
RETRIEVE P
FROM ASC P
WHERE source(P).id=128*a* AND target(P).id=126*b;*
  may return the last time when the subquery returns a non-empty example. For example, this may return the last time when host node 128*a* was in direct communication with VM node 126*b*. (If the query had been FIRST TIME WHEN, it may return the first time when the subquery returns a non-empty example.)
  As another example, the query
LAST TIME WHEN NOT EXISTS (
RETRIEVE P
FROM ASC P
WHERE source(P).id=128*a* AND target(P).id=126*b;*
  may return the last time when the subquery returns an empty example—e.g., when 128*a* and 126*b* were last disconnected. (If the query had been FIRST TIME WHEN, it may return the first time when 128*a* and 126*b* were disconnected.)

Another type of temporal query may be a "when" query. A "when" query may be similar to a "first/last time when" query, except that instead of returning the first or last time the subquery was satisfied, a "when" query may return the time intervals during which the subquery was satisfied.

In the exemplary query language syntax, a "when" query may follow the following formats:
WHEN EXISTS (Q),
for queries looking for the time intervals when the subquery
  Q returns a nonempty result, or WHEN NOT EXISTS
  (Q), for queries looking for the time intervals when the subquery Q returns an empty result.

A "when" query may be limited to a time range by the user. For example, it may be advantageous to know specific time intervals on a given day during which a condition existed. In the exemplary query language, the time range may be specified using a BETWEEN clause. For example, a time-limited "when" query may satisfy one of the following expressions:

WHEN BETWEEN t1 AND t2 EXISTS (Q) or
WHEN BETWEEN t1 AND t2 NOT EXISTS (Q), where (t1, t2) defines the time interval during which the when query is applied.

Figure 3:
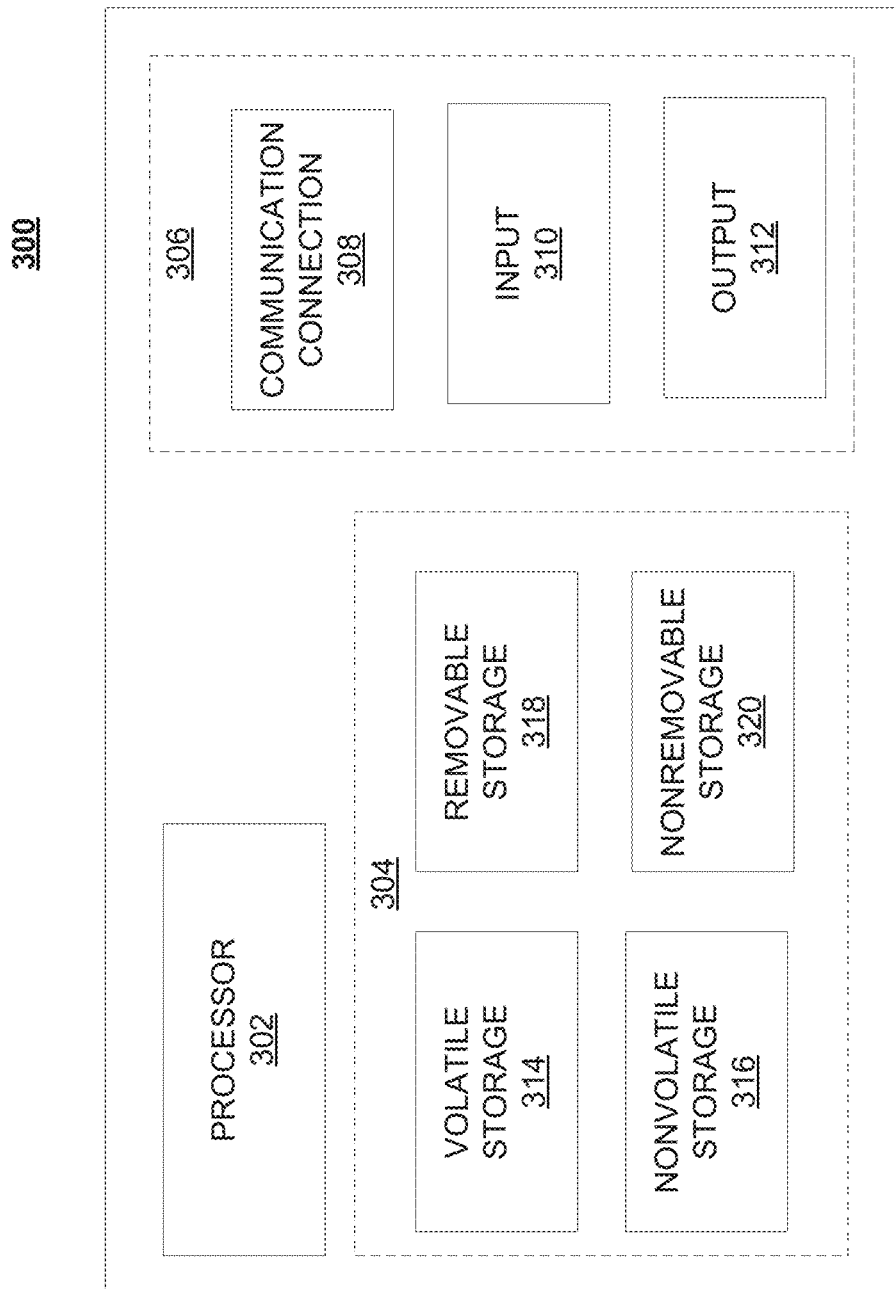

FIG. 3 is a block diagram of network device 300 that may be connected to or comprise a component of network 100 or system 200. Network device 300 may comprise hardware or a combination of hardware and software. The functionality to facilitate telecommunications via a telecommunications network may reside in one or combination of network devices 300. Network device 300 depicted in FIG. 3 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 3 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 3) to allow communications therebetween. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a nonremovable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 4:
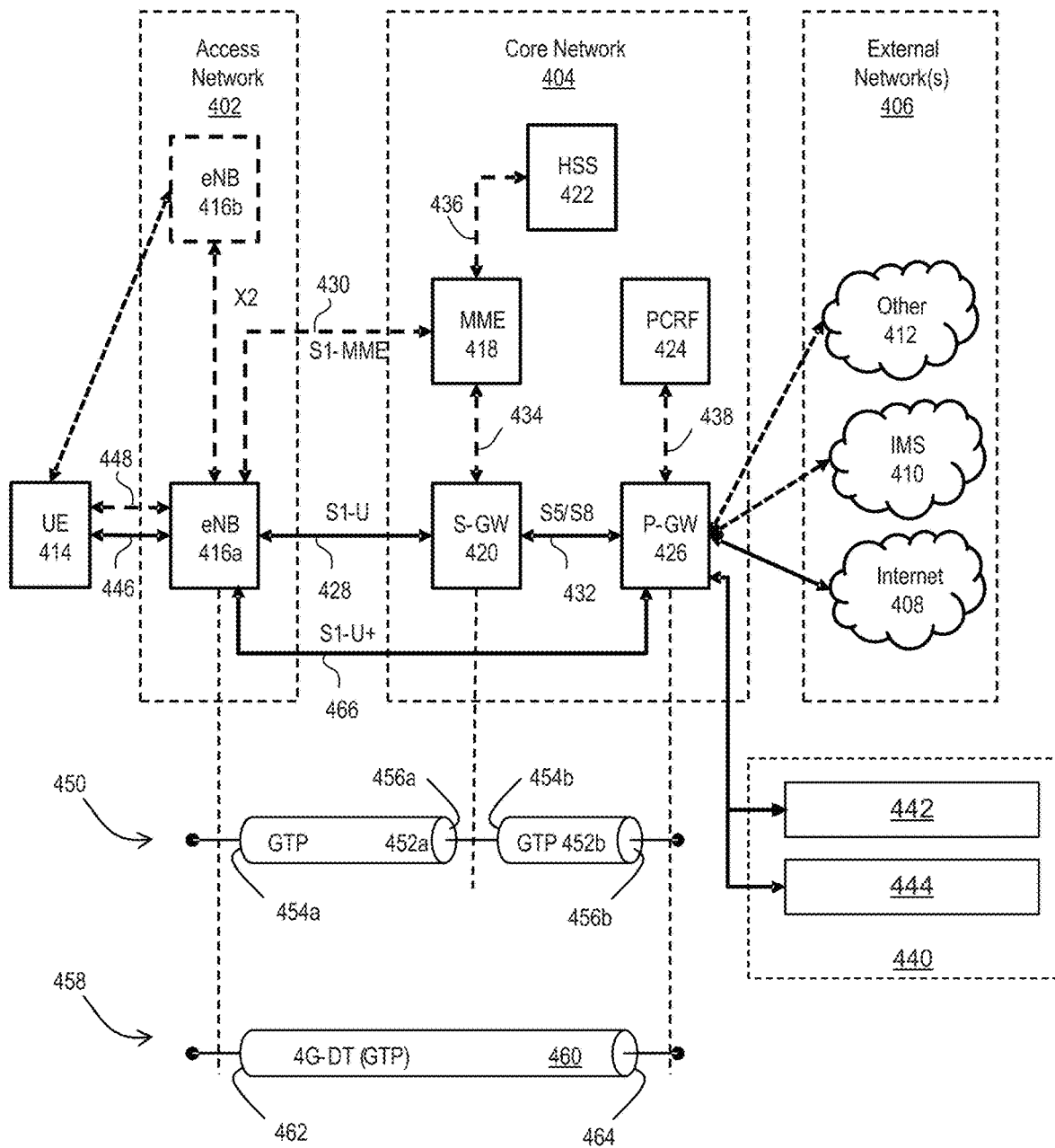
FIG. 4 depicts an exemplary communication system that provide wireless telecommunication services over wireless communication networks that may be modeled using the disclosed systems and methods for creating a graph database.

FIG. 4 illustrates a functional block diagram depicting one example of an LTE-EPS network architecture 400 related to the current disclosure. For example, network architecture 400 may include network 100. The network architecture 400 disclosed herein is referred to as a modified LTE-EPS architecture 400 to distinguish it from a traditional LTE-EPS architecture.

An example modified LTE-EPS architecture 400 is based at least in part on standards developed by the 3rd Generation Partnership Project (3GPP), with information available at www.3gpp.org. In one embodiment, the LTE-EPS network architecture 400 includes an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like. In an aspect, access network 402, core network 404, or external network 405 may include or communicate with network 100.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as UE 414, and one or more wireless access nodes, or base stations 416a, 416b. During network operations, at least one base station 416 communicates directly with UE 414. Base station 416 can be an evolved Node B (e-NodeB), with which UE 414 communicates over the air and wirelessly. UEs 414 can include, without limitation, wireless devices, e.g., satellite communication systems, portable digital assistants (PDAs), laptop computers, tablet devices and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as MME 418, SGW 420, Home Subscriber Server (HSS) 422, Policy and Charging Rules Function (PCRF) 424 and PGW 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416a to second eNB 416b as may be the result of UE 414 moving from one area of coverage, e.g., cell, to another. SGW 420 can also terminate a downlink data path, e.g., from external network 406 to UE 414 in an idle state, and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), and/or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity 406, and triggers paging of UE 414 when data arrives for UE 414. If UE 414 responds to the page, SGW 420 can forward the IP packet to eNB 416a.

HSS 422 can manage subscription-related information for a user of UE 414. For example, tHSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416a and PGW 426. Notably, S1-U+ path/interface does not include SGW 420, a node that is otherwise instrumental in configuring and/or managing packet forwarding between eNB 416a and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory and/or disk drive. It is understood that storage device 440 can include registers suitable for storing address values. Alternatively or in addition, storage device 440 can be separate from PGW 426, for example, as an external hard drive, a flash drive, and/or network storage.

Storage device 440 selectively stores one or more values relevant to the forwarding of packet data. For example, storage device 440 can store identities and/or addresses of network entities, such as any of network nodes 418, 420, 422, 424, and 426, eNBs 416 and/or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read and/or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 402 and core network 404 are illustrated in a simplified block diagram in FIG. 4. In other words, either or both of access network 402 and the core network 404 can include additional network elements that are not shown, such as various routers, switches and controllers. In addition, although FIG. 4 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416a, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416a, a second portion (e.g., an S1 data bearer 428) between eNB 416a and SGW 420, and a third portion (e.g., an S5/S8 bearer 432) between SGW 420 and PGW 426. Various signaling bearer portions are also illustrated in FIG. 4. For example, a first signaling portion (e.g., a signaling radio bearer 448) between UE 414 and eNB 416a, and a second signaling portion (e.g., S1 signaling bearer 430) between eNB 416a and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 400, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 450 includes a first tunnel 452a between two tunnel endpoints 454a and 456a, and a second tunnel 452b between two tunnel endpoints 454b and 456b. In the illustrative example, first tunnel 452a is established between eNB 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S1-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456b corresponding to an S5-U address of PGW 426 (referred to herein as the PGW S5-U address).

In at least some embodiments, first tunnel solution 450 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416a and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416a and PGW 426, by way of SGW 420. That is, SGW 420 can serve a relay function, by relaying packets between two tunnel endpoints 416a, 426. In other scenarios, direct tunneling solution 458 can forward user data packets between eNB 416a and PGW 426, by way of the S1 U+ interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual bases. That is, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416a. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 5:
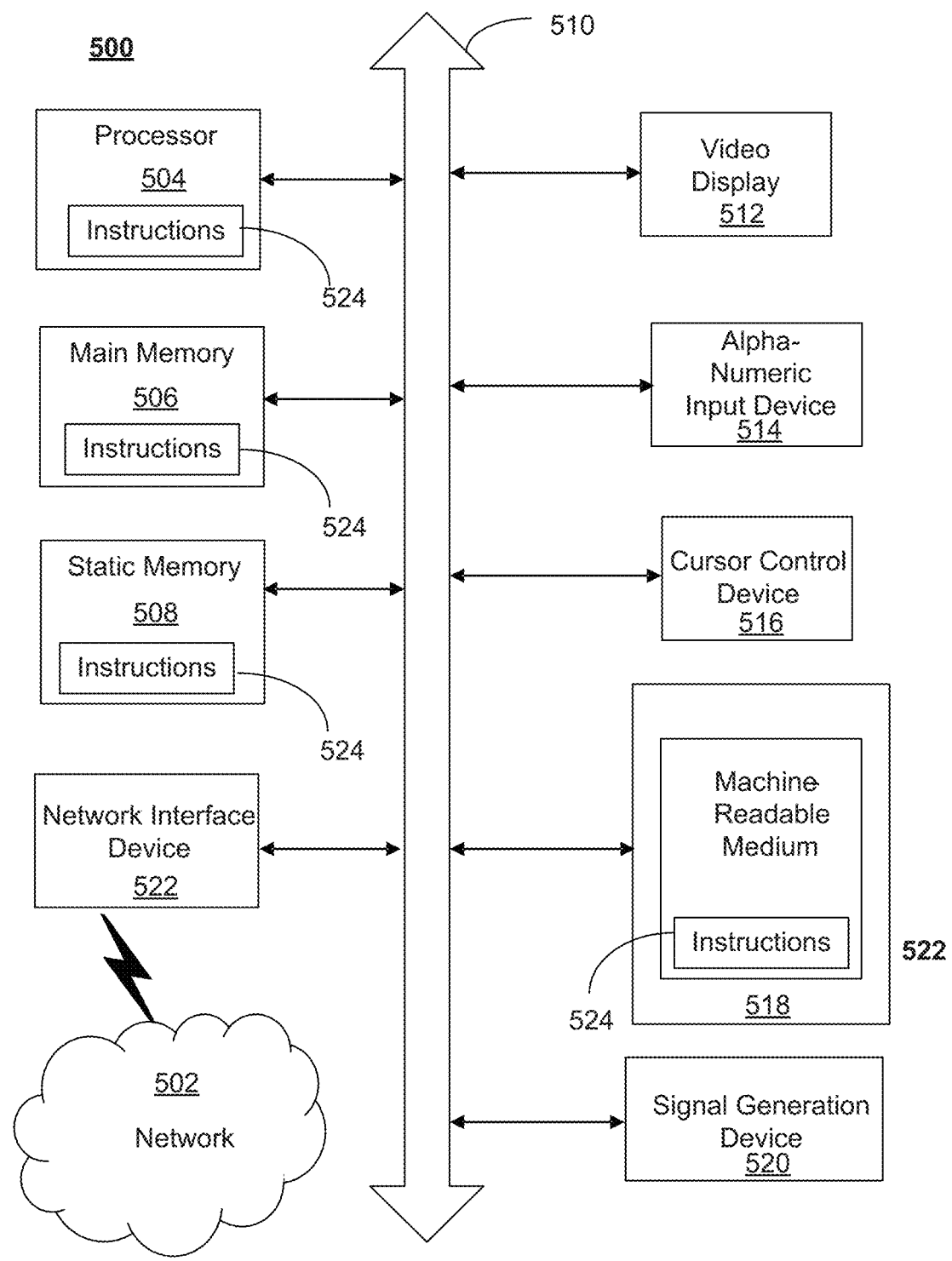
FIG. 5 depicts an exemplary communication system that provide wireless telecommunication services over wireless communication networks that may be modeled using the disclosed systems and methods for creating a graph database.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as processor 302, UE 414, eNB 416, MME 418, SGW 420, HSS 422, PCRF 424, PGW 426 and other devices of FIGS. 1, 2, and 4. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 6:
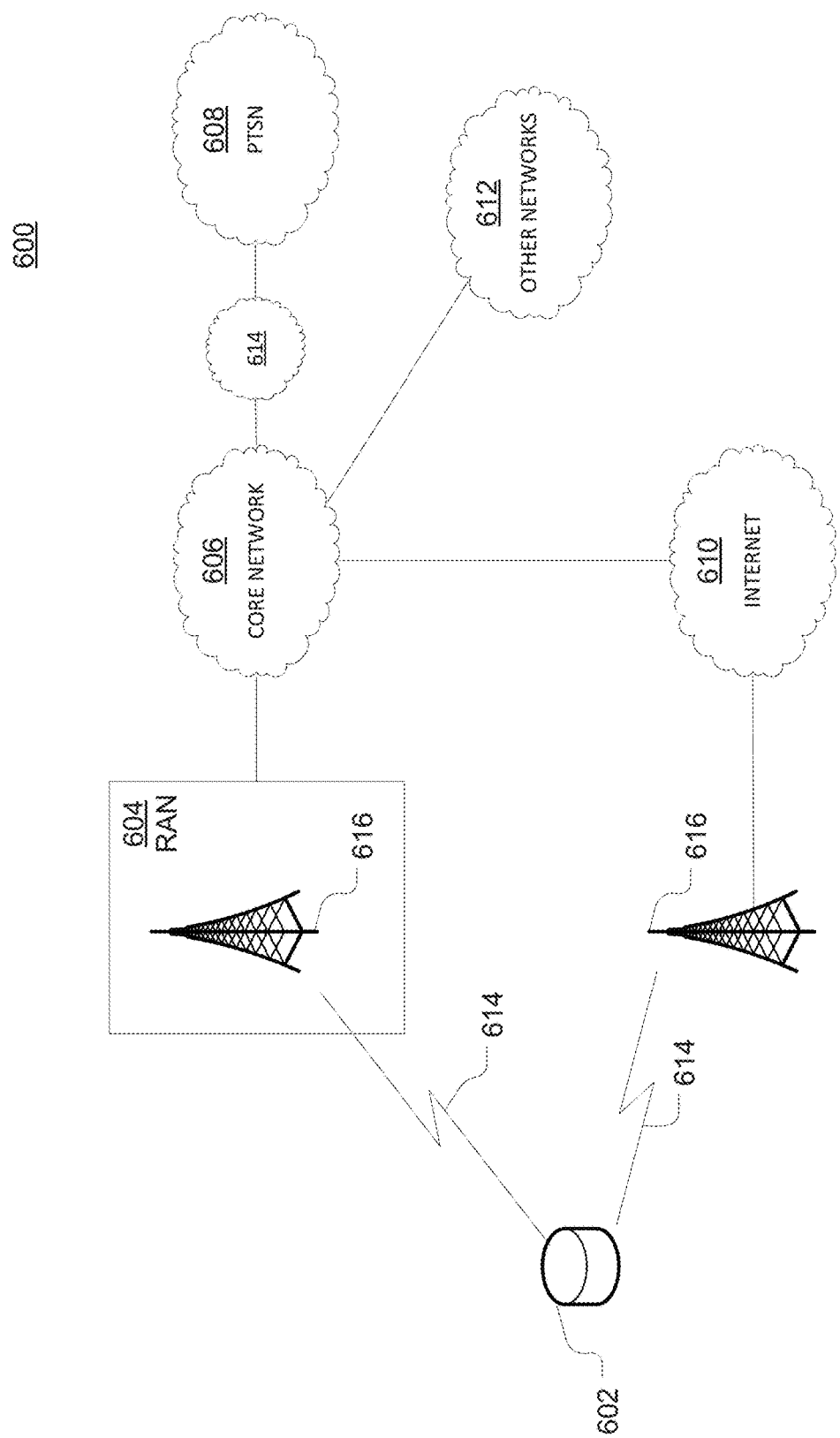
FIG. 6 is a diagram of an exemplary telecommunications system in which the disclosed methods and processes may be implemented.

As shown in FIG. 6, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise drone 102, a mobile device, network device 300, or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 6, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 6, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 7:
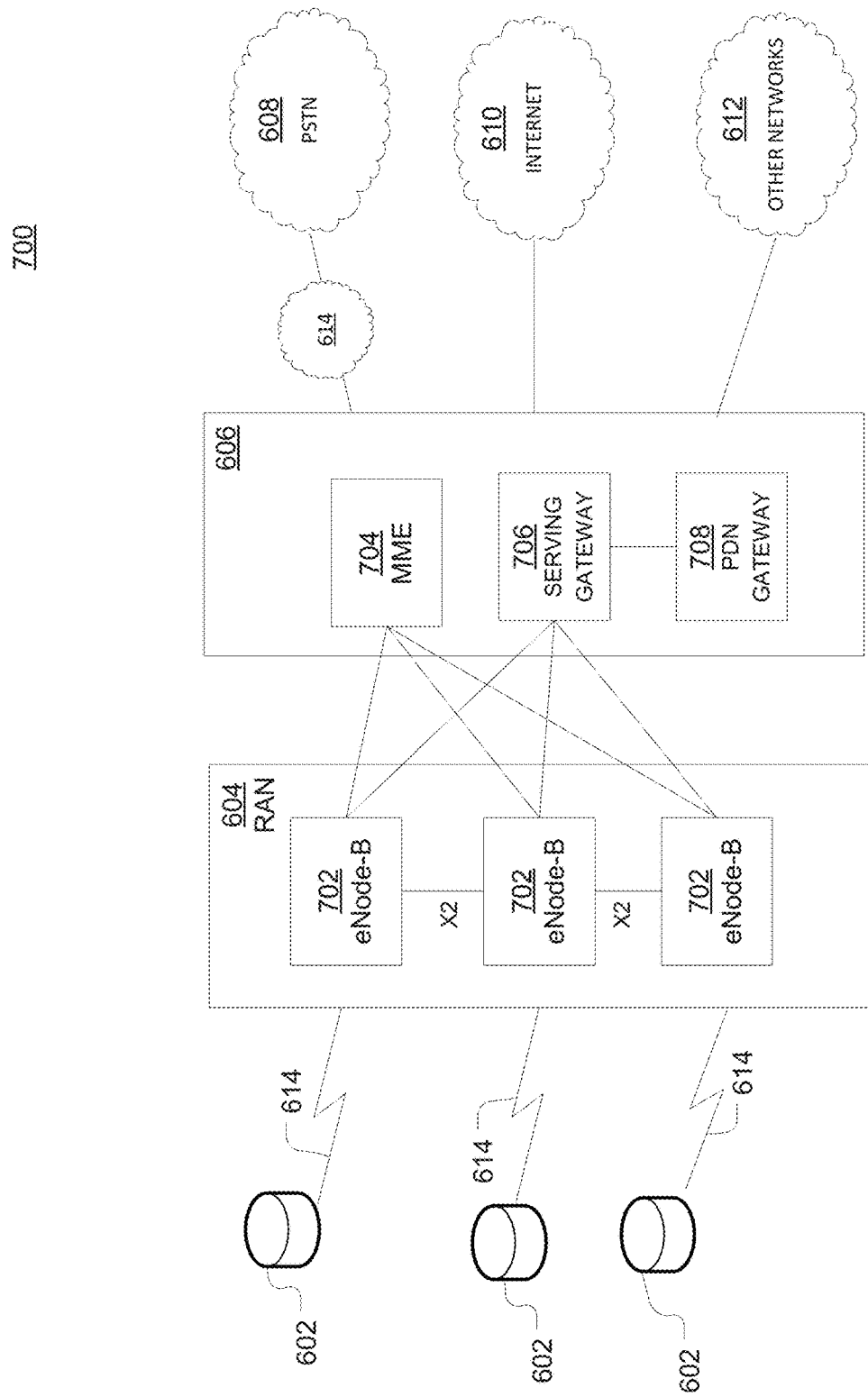
FIG. 7 is an example system diagram of a radio access network and a core network that may be modeled using the disclosed systems and methods for creating a graph database.

FIG. 7 is an example system 400 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNode-Bs 702 while remaining consistent with the disclosed technology. One or more eNode-Bs 702 may include one or more transceivers for communicating with the WTRUs 602 over air interface 614. Optionally, eNode-Bs 702 may implement MIMO technology. Thus, one of eNode-Bs 702, for example, may use multiple antennas to transmit wireless signals to, or receive wireless signals from, one of WTRUs 602.

Each of eNode-Bs 702 may be associated with a particular cell (not shown) and may be configured to handle radio resource management decisions, handover decisions, scheduling of users in the uplink or downlink, or the like. As shown in FIG. 7 eNode-Bs 702 may communicate with one another over an X2 interface.

Core network 606 shown in FIG. 7 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNode-Bs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs (not shown) that employ other radio technologies, such as GSM or WCDMA.

Serving gateway 706 may be connected to each of eNode-Bs 702 in RAN 604 via the S1 interface. Serving gateway 706 may generally route or forward user data packets to or from the WTRUs 602. Serving gateway 706 may also perform other functions, such as anchoring user planes during inter-eNode B handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 614, to facilitate communications between WTRUs 602 and traditional landline communications devices. In addition, core network 606 may provide the WTRUs 602 with access to other networks 612, which may include other wired or wireless networks that are owned or operated by other service providers.

Figure 8:
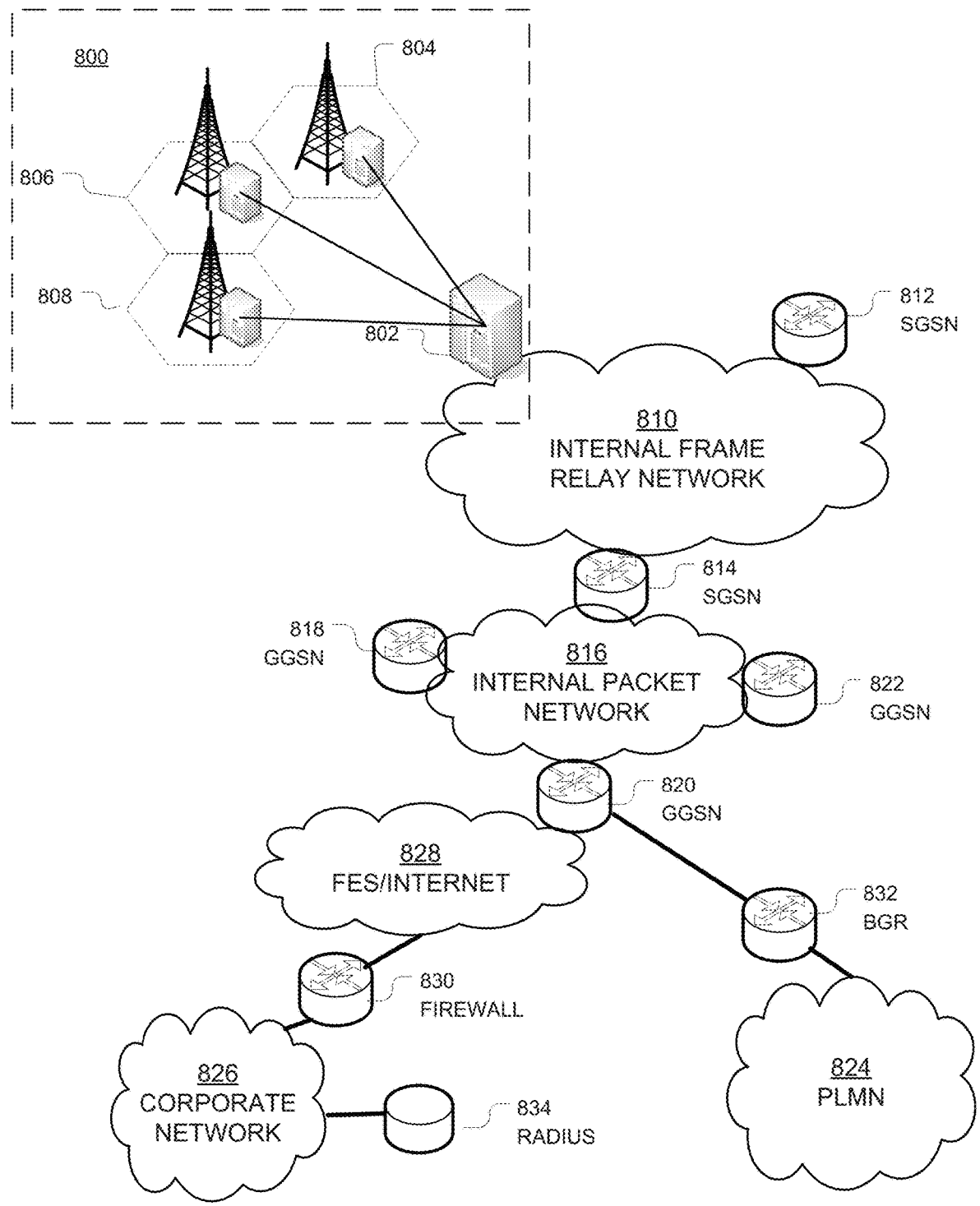
FIG. 8 depicts an overall block diagram of an example packet-based mobile cellular network environment, such as a general packet radio service (GPRS) network that may be modeled using the disclosed systems and methods for creating a graph database.

FIG. 8 depicts an overall block diagram of an example packet-based mobile cellular network environment, such as a GPRS network as described herein. In the example packet-based mobile cellular network environment shown in FIG. 8, there are a plurality of base station subsystems (BSS) 800 (only one is shown), each of which comprises a base station controller (BSC) 802 serving a plurality of BTSs, such as BTSs 804, 806, 808. BTSs 804, 806, 808 are the access points where users of packet-based mobile devices become connected to the wireless network. In example fashion, the packet traffic originating from mobile devices is transported via an over-the-air interface to BTS 808, and from BTS 808 to BSC 802. Base station subsystems, such as BSS 800, are a part of internal frame relay network 810 that can include a service GPRS support nodes (SGSN), such as SGSN 812 or SGSN 814. Each SGSN 812, 814 is connected to an internal packet network 816 through which SGSN 812, 814 can route data packets to or from a plurality of gateway GPRS support nodes (GGSN) 818, 820, 822. As illustrated, SGSN 814 and GGSNs 818, 820, 822 are part of internal packet network 816. GGSNs 818, 820, 822 mainly provide an interface to external IP networks such as PLMN 824, corporate intranets/internets 826, or Fixed-End System (FES) or the public Internet 828. As illustrated, subscriber corporate network 826 may be connected to GGSN 820 via a firewall 830. PLMN 824 may be connected to GGSN 820 via a boarder gateway router (BGR) 832. A Remote Authentication Dial-In User Service (RADIUS) server 834 may be used for caller authentication when a user calls corporate network 826.

Generally, there may be a several cell sizes in a network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 9:
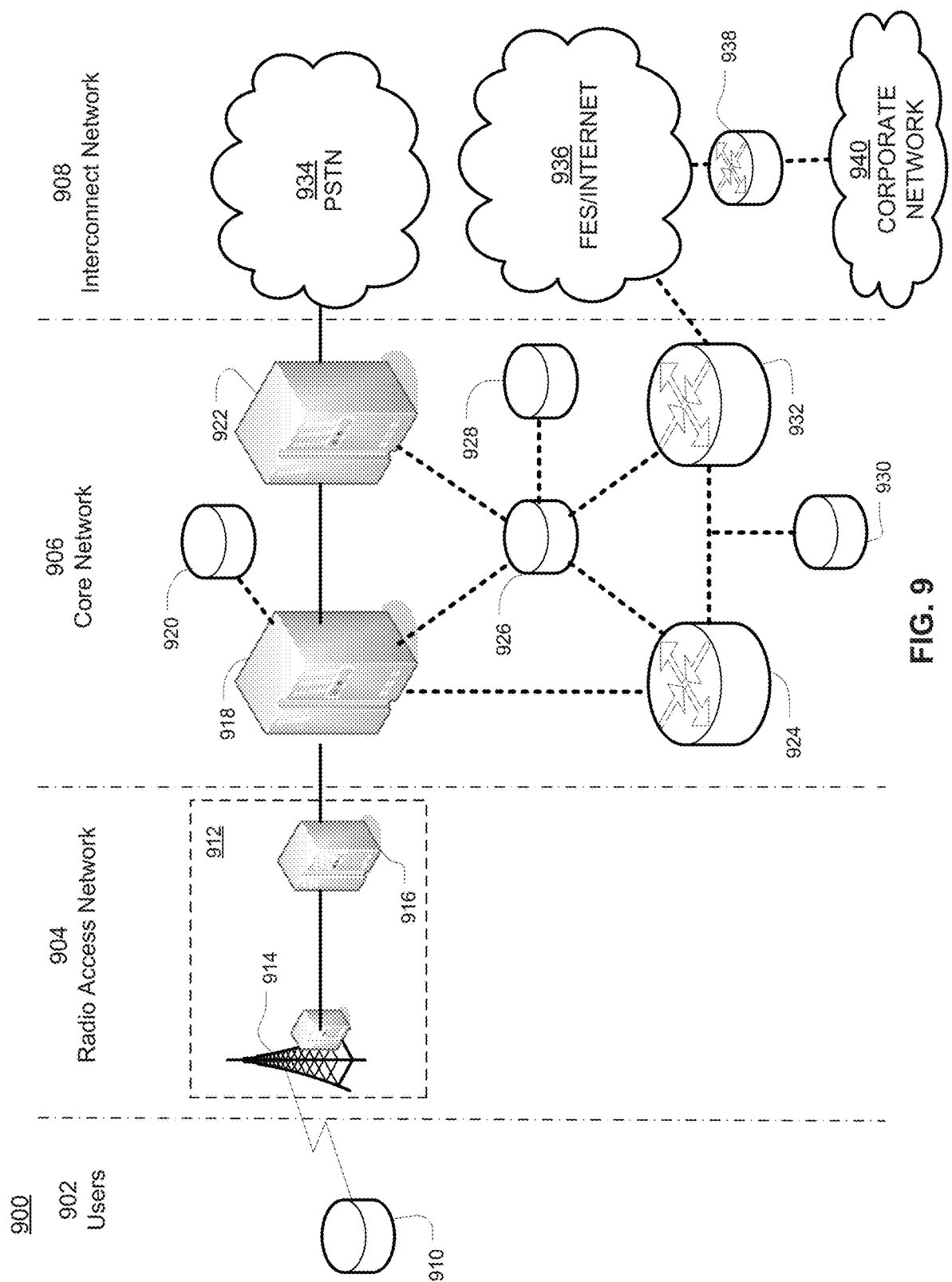
FIG. 9 illustrates an exemplary architecture of a GPRS network that may be modeled using the disclosed systems and methods for creating a graph database.

FIG. 9 illustrates an architecture of a typical GPRS network 900 as described herein. The architecture depicted in FIG. 9 may be segmented into four groups: users 902, RAN 904, core network 906, and interconnect network 908. Users 902 comprise a plurality of end users, who each may use one or more devices 910. Note that device 910 is referred to as a mobile subscriber (MS) in the description of network shown in FIG. 9. In an example, device 910 comprises a communications device (e.g., mobile device 102, mobile positioning center 116, network device 300, any of detected devices 500, second device 508, access device 604, access device 606, access device 608, access device 610 or the like, or any combination thereof). Radio access network 904 comprises a plurality of BSSs such as BSS 912, which includes a BTS 914 and a BSC 916. Core network 906 may include a host of various network elements. As illustrated in FIG. 9, core network 906 may comprise MSC 918, service control point (SCP) 920, gateway MSC (GMSC) 922, SGSN 924, home location register (HLR) 926, authentication center (AuC) 928, domain name system (DNS) server 930, and GGSN 932. Interconnect network 908 may also comprise a host of various networks or other network elements. As illustrated in FIG. 9, interconnect network 908 comprises a PSTN 934, an FES/Internet 936, a firewall 1038, or a corporate network 940.

An MSC can be connected to a large number of BSCs. At MSC 918, for instance, depending on the type of traffic, the traffic may be separated in that voice may be sent to PSTN 934 through GMSC 922, or data may be sent to SGSN 924, which then sends the data traffic to GGSN 932 for further forwarding.

When MSC 918 receives call traffic, for example, from BSC 916, it sends a query to a database hosted by SCP 920, which processes the request and issues a response to MSC 918 so that it may continue call processing as appropriate.

HLR 926 is a centralized database for users to register to the GPRS network. HLR 926 stores static information about the subscribers such as the International Mobile Subscriber Identity (IMSI), subscribed services, or a key for authenticating the subscriber. HLR 926 also stores dynamic subscriber information such as the current location of the MS. Associated with HLR 926 is AuC 928, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 9, when MS 910 initiates the attach process by turning on the network capabilities of the mobile device, an attach request is sent by MS 910 to SGSN 924. The SGSN 924 queries another SGSN, to which MS 910 was attached before, for the identity of MS 910. Upon receiving the identity of MS 910 from the other SGSN, SGSN 924 requests more information from MS 910. This information is used to authenticate MS 910 together with the information provided by HLR 926. Once verified, SGSN 924 sends a location update to HLR 926 indicating the change of location to a new SGSN, in this case SGSN 924. HLR 926 notifies the old SGSN, to which MS 910 was attached before, to cancel the location process for MS 910. HLR 926 then notifies SGSN 924 that the location update has been performed. At this time, SGSN 924 sends an Attach Accept message to MS 910, which in turn sends an Attach Complete message to SGSN 924.

Next, MS 910 establishes a user session with the destination network, corporate network 940, by going through a Packet Data Protocol (PDP) activation process. Briefly, in the process, MS 910 requests access to the Access Point Name (APN), for example, UPS.com, and SGSN 924 receives the activation request from MS 910. SGSN 924 then initiates a DNS query to learn which GGSN 932 has access to the UPS.com APN. The DNS query is sent to a DNS server within core network 906, such as DNS server 930, which is provisioned to map to one or more GGSNs in core network 906. Based on the APN, the mapped GGSN 932 can access requested corporate network 940. SGSN 924 then sends to GGSN 932 a Create PDP Context Request message that contains necessary information. GGSN 932 sends a Create PDP Context Response message to SGSN 924, which then sends an Activate PDP Context Accept message to MS 910.

Once activated, data packets of the call made by MS 910 can then go through RAN 904, core network 906, and interconnect network 908, in a particular FES/Internet 936 and firewall 1038, to reach corporate network 940.

Figure 10:
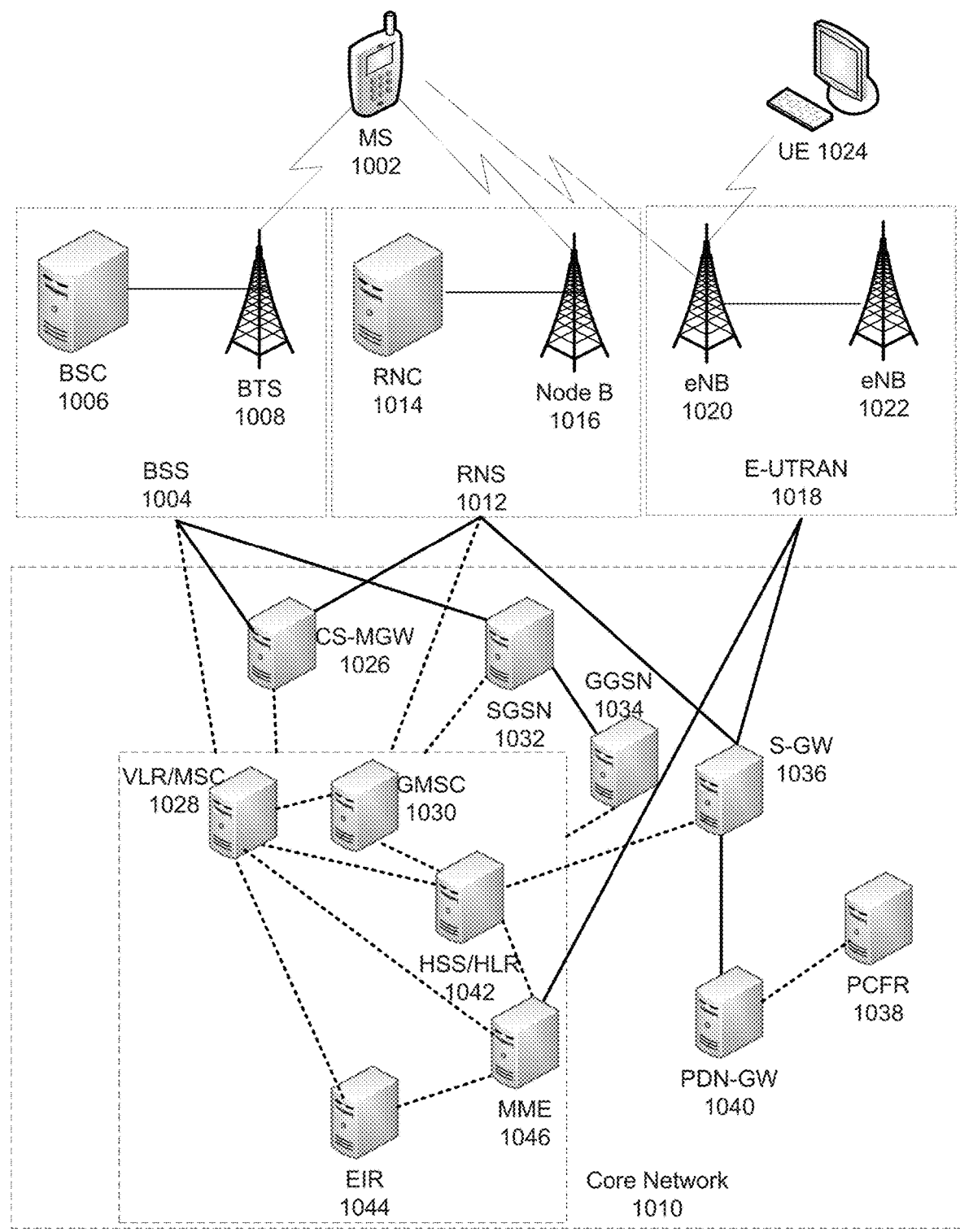
FIG. 10 is a block diagram of an exemplary public land mobile network (PLMN) that may be modeled using the disclosed systems and methods for creating a graph database.

FIG. 10 illustrates a PLMN block diagram view of an example architecture that may be replaced by a telecommunications system. In FIG. 10, solid lines may represent user traffic signals, and dashed lines may represent support signaling. MS 1002 is the physical equipment used by the PLMN subscriber. For example, drone 102, network device 300, the like, or any combination thereof may serve as MS 1002. MS 1002 may be one of, but not limited to, a cellular telephone, a cellular telephone in combination with another electronic device or any other wireless mobile communication device.

MS 1002 may communicate wirelessly with BSS 1004. BSS 1004 contains BSC 1006 and a BTS 1008. BSS 1004 may include a single BSC 1006/BTS 1008 pair (base station) or a system of BSC/BTS pairs that are part of a larger network. BSS 1004 is responsible for communicating with MS 1002 and may support one or more cells. BSS 1004 is responsible for handling cellular traffic and signaling between MS 1002 and a core network 1010. Typically, BSS 1004 performs functions that include, but are not limited to, digital conversion of speech channels, allocation of channels to mobile devices, paging, or transmission/reception of cellular signals.

Additionally, MS 1002 may communicate wirelessly with RNS 1012. RNS 1012 contains a Radio Network Controller (RNC) 1014 and one or more Nodes B 1016. RNS 1012 may support one or more cells. RNS 1012 may also include one or more RNC 1014/Node B 1016 pairs or alternatively a single RNC 1014 may manage multiple Nodes B 1016. RNS 1012 is responsible for communicating with MS 1002 in its geographically defined area. RNC 1014 is responsible for controlling Nodes B 1016 that are connected to it and is a control element in a UMTS radio access network. RNC 1014 performs functions such as, but not limited to, load control, packet scheduling, handover control, security functions, or controlling MS 1002 access to core network 1010.

An E-UTRA Network (E-UTRAN) 1018 is a RAN that provides wireless data communications for MS 1002 and UE 1024. E-UTRAN 1018 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1018 may include of series of logical network components such as E-UTRAN Node B (eNB) 1020 and E-UTRAN Node B (eNB) 1022. E-UTRAN 1018 may contain one or more eNBs. User equipment (UE) 1024 may be any mobile device capable of connecting to E-UTRAN 1018 including, but not limited to, a personal computer, laptop, mobile device, wireless router, or other device capable of wireless connectivity to E-UTRAN 1018. The improved performance of the E-UTRAN 1018 relative to a typical UMTS network allows for increased bandwidth, spectral efficiency, and functionality including, but not limited to, voice, high-speed applications, large data transfer or IPTV, while still allowing for full mobility.

Typically MS 1002 may communicate with any or all of BSS 1004, RNS 1012, or E-UTRAN 1018. In a illustrative system, each of BSS 1004, RNS 1012, and E-UTRAN 1018 may provide MS 1002 with access to core network 1010. Core network 1010 may include of a series of devices that route data and communications between end users. Core network 1010 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The circuit-switched MGW function (CS-MGW) 1026 is part of core network 1010, and interacts with VLR/MSC server 1028 and GMSC server 1030 in order to facilitate core network 1010 resource control in the CS domain. Functions of CS-MGW 1026 include, but are not limited to, media conversion, bearer control, payload processing or other mobile network processing such as handover or anchoring. CS-MGW 1026 may receive connections to MS 1002 through BSS 1004 or RNS 1012.

SGSN 1032 stores subscriber data regarding MS 1002 in order to facilitate network functionality. SGSN 1032 may store subscription information such as, but not limited to, the IMSI, temporary identities, or PDP addresses. SGSN 1032 may also store location information such as, but not limited to, GGSN address for each GGSN 1034 where an active PDP exists. GGSN 1034 may implement a location register function to store subscriber data it receives from SGSN 1032 such as subscription or location information.

Serving gateway (S-GW) 1036 is an interface which provides connectivity between E-UTRAN 1018 and core network 1010. Functions of S-GW 1036 include, but are not limited to, packet routing, packet forwarding, transport level packet processing, or user plane mobility anchoring for inter-network mobility. PCRF 1038 uses information gathered from P-GW 1036, as well as other sources, to make applicable policy and charging decisions related to data flows, network resources or other network administration functions. PDN gateway (PDN-GW) 1040 may provide user-to-services connectivity functionality including, but not limited to, GPRS/EPC network anchoring, bearer session anchoring and control, or IP address allocation for PS domain connections.

HSS 1042 is a database for user information and stores subscription data regarding MS 1002 or UE 1024 for handling calls or data sessions. Networks may contain one HSS 1042 or more if additional resources are required. Example data stored by HSS 1042 include, but is not limited to, user identification, numbering or addressing information, security information, or location information. HSS 1042 may also provide call or session establishment procedures in both the PS and CS domains.

VLR/MSC Server 1028 provides user location functionality. When MS 1002 enters a new network location, it begins a registration procedure. A MSC server for that location transfers the location information to the VLR for the area. A VLR and MSC server may be located in the same computing environment, as is shown by VLR/MSC server 1028, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1002 registration or procedures for handover of MS 1002 to a different section of core network 1010. GMSC server 1030 may serve as a connection to alternate GMSC servers for other MSs in larger networks.

EIR 1044 is a logical element which may store the IMEI for MS 1002. User equipment may be classified as either "white listed" or "black listed" depending on its status in the network. If MS 1002 is stolen and put to use by an unauthorized user, it may be registered as "black listed" in EIR 1044, preventing its use on the network. A MME 1046 is a control node which may track MS 1002 or UE 1024 if the devices are idle. Additional functionality may include the ability of MME 1046 to contact idle MS 1002 or UE 1024 if retransmission of a previous session is required.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which emergency alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

The invention claimed is:

1. A system comprising:
a processor;
a user input; and
memory comprising a graph database comprising a temporal network inventory and executable instructions, wherein the executable instructions cause the processor to effectuate operations, the operations comprising:
receiving, via the user input, a query to identify at least one pathway within the temporal network inventory, the query comprising pathway variables and at least one evaluation time;
determining an anchor set of nodes based on at least one of the pathway variables, wherein the at least one pathway comprises a first node of the anchor set of nodes;
translating the pathway variables into a pathway algebraic expression based on the anchor set and the at least one evaluation time; and
executing the pathway algebraic expression on the graph database to return a pathway set including the at least one pathway.

2. The system of claim 1,
wherein the at least one evaluation time comprises a first evaluation time and a second evaluation time,
wherein the pathway algebraic expression comprises a first expression associated with the first evaluation time and a second expression associated with the second evaluation time, and wherein executing the pathway algebraic expression on the graph database further comprises:
determining a first set based on executing the first expression on the graph database;
determining a second set based on executing the second expression on the graph database;
computing the Cartesian product based on the first expression and the second expression;
applying a selection to the Cartesian product based on a condition of the query; and
determining the pathway set based on a projection of the selection.

3. The system of claim 1, wherein the pathway set comprises a plurality of pathways, and each of the plurality of pathways is valid at the at least one evaluation time.

4. The system of claim 1, the operations further comprising selecting the graph database based on the at least one evaluation time.

5. The system of claim 1,
wherein the at least one evaluation time comprises a first evaluation time and a second evaluation time,
wherein the pathway variables comprise a first variable associated with the first evaluation time and a second variable associated with the second evaluation time, and
wherein translating the pathway variables comprises:
translating the first variable into a first expression based on the first evaluation time; and
translating the second variable into a second expression based on the first evaluation time,
wherein the pathway algebraic expression is based on the first expression and the second expression.

6. A method comprising:
receiving, via a processor, a query to identify at least one pathway within a temporal network inventory, the query comprising pathway variables and at least one evaluation time;
determining an anchor set of nodes based on at least one of the pathway variables, wherein the at least one pathway comprises a first node of the anchor set of nodes;
translating the pathway variables into a pathway algebraic expression based on the anchor set and the at least one evaluation time; and
executing the pathway algebraic expression on a graph database comprising the temporal network inventory to return a pathway set including the at least one pathway.

7. The method of claim 6, wherein the at least one evaluation time comprises a first evaluation time and a second evaluation time and wherein the pathway algebraic expression comprises a first expression associated with the first evaluation time and a second expression associated with the second evaluation time, and wherein executing the pathway algebraic expression on the graph database further comprises:
determining a first set based on executing the first expression on the graph database;
determining a second set based on executing the second expression on the graph database;
computing the Cartesian product based on the first expression and the second expression;
applying a selection to the Cartesian product based on a condition of the query; and
determining the pathway set based on a projection of the selection.

8. The method of claim 6, wherein the pathway set comprises a plurality of pathways, and each of the plurality of pathways is valid at the at least one evaluation time.

9. The method of claim 6, further comprising selecting the graph database based on the at least one evaluation time.

10. The method of claim 6, wherein the graph database comprises nodes and edges and the pathway set comprises a sequence of at least a subset of the nodes and the edges.

11. The method of claim 6, wherein the query is expressed as a second pathway set.

12. The method of claim 6,
wherein the at least one evaluation time comprises a first evaluation time and a second evaluation time,
wherein the pathway variables comprise a first variable and a second variable, wherein the first variable is associated with the first evaluation time and the second variable is associated with the second evaluation time, and wherein translating the pathway variables comprises:
translating the first variable into a first expression based on the first evaluation time; and
translating the second variable into a second expression based on the first evaluation time, wherein the pathway algebraic expressions comprise the first expression and the second expression.

13. A method comprising:
receiving, via a processor, a query to identify at least one pathway within a temporal network inventory, the query comprising pathway variables and a time interval;
determining an anchor set of nodes based on at least one of the pathway variables, wherein the at least one pathway comprises a first node of the anchor set of nodes;
translating the pathway variables into a pathway algebraic expression based on the anchor set and the at least one evaluation time; and
executing the pathway algebraic expression on a graph database comprising the temporal network inventory to return a pathway set comprising the at least one pathway and a valid time associated with the at least one pathway.

14. The method of claim 13, wherein the valid time overlaps with the time interval.

15. The method of claim 13, wherein the pathway algebraic expression comprises an extension operator to extend a first node by a second node.

16. The method of claim 15, further comprising: confirming that the second node is valid during at least a first portion of the time interval.

17. The method of claim 16, further comprising confirming that an intervening edge connecting the first node to the second node is valid during at least a second portion of the time interval.

18. The method of claim 17, further comprising that the first portion of the time interval and the second portion of the time interval at least partially overlap.

19. The method of claim 13, further comprising:
confirming that each element of the pathway set is valid during at least a portion of the time interval.

20. The method of claim 13, further comprising a second time interval associated with a first pathway variable of the pathway variables.

* * * * *